(12) United States Patent
Boivin et al.

(10) Patent No.: US 9,340,319 B2
(45) Date of Patent: May 17, 2016

(54) CARGO PALLET AND METHOD OF MANUFACTURE THEREOF

(71) Applicant: NORDUYN INC., Montreal (CA)

(72) Inventors: Mathieu Boivin, Montreal (CA); Martin Belanger, Montreal (CA); Joseph Issa, Roxboro (CA)

(73) Assignee: NORDUYN INC., Montreal (CA)

( * ) Notice: Subject to any disclaimer, the term of this patent is extended or adjusted under 35 U.S.C. 154(b) by 610 days.

(21) Appl. No.: 13/666,016

(22) Filed: Nov. 1, 2012

(65) Prior Publication Data
US 2013/0291767 A1 Nov. 7, 2013

Related U.S. Application Data

(60) Provisional application No. 61/557,794, filed on Nov. 9, 2011.

(51) Int. Cl.
| | |
|---|---|
| *B65D 19/18* | (2006.01) |
| *B65D 19/32* | (2006.01) |
| *B65D 19/00* | (2006.01) |
| *B65D 88/14* | (2006.01) |
| *B29L 31/00* | (2006.01) |
| *B29C 65/00* | (2006.01) |

(52) U.S. Cl.
CPC ........ *B65D 19/0069* (2013.01); *B65D 19/0002* (2013.01); *B65D 19/0004* (2013.01); *B29C 66/112* (2013.01); *B29C 66/114* (2013.01); *B29C 66/5346* (2013.01); *B29C 66/721* (2013.01); *B29C 66/7212* (2013.01); *B29C 66/7254* (2013.01); *B29C 66/7392* (2013.01); *B29L 2031/7178* (2013.01); *B65D 88/14* (2013.01); *B65D 2519/00024* (2013.01); *B65D 2519/00034* (2013.01); *B65D 2519/00044* (2013.01); *B65D 2519/00059* (2013.01); *B65D 2519/00069* (2013.01); *B65D 2519/00079* (2013.01); *B65D 2519/00129* (2013.01); *B65D 2519/00273* (2013.01); *B65D 2519/00303* (2013.01); *B65D 2519/00358* (2013.01); *B65D 2519/00432* (2013.01); *B65D 2519/00562* (2013.01); *B65D 2519/00572* (2013.01); *B65D 2519/00786* (2013.01); *B65D 2519/00815* (2013.01); *Y10T 29/49826* (2015.01)

(58) Field of Classification Search
CPC .......... B65D 2519/00303; B65D 2519/00562; B65D 2519/00044; B65D 2519/00273; B65D 2519/00278; B65D 2519/00034; B65D 2519/00039; B65D 2519/00069; B65D 2519/00074; B65D 2519/00786; B65D 2519/00079
USPC ............ 428/294.4, 298.1, 299.4; 248/346.02, 248/346.5; 52/784.14, 784.15, 787.11, 52/793.1, 794.1, 802.1, 802.11
See application file for complete search history.

(56) References Cited

U.S. PATENT DOCUMENTS

| | | |
|---|---|---|
| 687,807 A | 12/1901 | Winter |
| 980,570 A | 1/1911 | Sommerfield |

(Continued)

FOREIGN PATENT DOCUMENTS

| | | |
|---|---|---|
| EM | 0366223 | 5/1990 |
| EP | 0233739 | 8/1987 |

(Continued)

*Primary Examiner* — Michael Safavi
(74) *Attorney, Agent, or Firm* — Mathieu Audet

(57) ABSTRACT

A reinforced composite material cargo pallet including a core reinforced with two fused opposed layers of thermoplastic material and two opposed layers of aluminum is provided. The core, the layers of thermoplastic material and the two opposed layers of aluminum can be sized and designed to fit into a recess portion defined in the frame.

15 Claims, 27 Drawing Sheets

(56) References Cited

U.S. PATENT DOCUMENTS

| | | | | |
|---|---|---|---|---|
| 1,165,885 | A | 12/1915 | Lee | |
| 2,688,493 | A | 9/1954 | Rosenberg | |
| 2,893,588 | A | 7/1959 | Martin | |
| 3,156,370 | A | 11/1964 | Montfort | |
| 3,331,174 | A * | 7/1967 | Wesch | B62D 33/04 52/309.11 |
| 3,351,027 | A | 11/1967 | Ellard, Jr. et al. | |
| 3,524,415 | A | 8/1970 | Heiman | |
| 3,589,548 | A | 6/1971 | Weiss | |
| 3,591,121 | A | 7/1971 | Parris | |
| 3,591,122 | A | 7/1971 | Mehaffie | |
| 3,593,468 | A | 7/1971 | Bustin | |
| 3,711,363 | A * | 1/1973 | Jarema et al. | E04C 2/08 428/309.9 |
| 3,724,814 | A | 4/1973 | Walton | |
| 3,750,826 | A | 8/1973 | Donath | |
| 3,809,278 | A | 5/1974 | Csumrik | |
| 3,968,895 | A | 7/1976 | Barnes, Jr. | |
| 3,995,081 | A | 11/1976 | Fant | |
| 4,012,549 | A | 3/1977 | Slysh | |
| D245,319 | S | 8/1977 | Wodell | |
| 4,130,614 | A * | 12/1978 | Saidla | B29C 44/145 264/257 |
| 4,230,044 | A | 10/1980 | Rohrig | |
| 4,261,470 | A | 4/1981 | Dolan | |
| 4,347,794 | A | 9/1982 | Nordstrom | |
| 4,413,737 | A | 11/1983 | Wind | |
| 4,438,166 | A * | 3/1984 | Gluck | B29C 44/12 156/79 |
| 4,456,207 | A | 6/1984 | Engel | |
| 4,461,131 | A | 7/1984 | Pressell | |
| RE31,661 | E | 9/1984 | Mollon | |
| 4,475,704 | A | 10/1984 | Marom | |
| 4,625,880 | A | 12/1986 | Pym | |
| RE32,344 | E | 2/1987 | Wind | |
| 4,660,796 | A | 4/1987 | Garrec | |
| 4,667,094 | A | 5/1987 | Van-Hecke | |
| 4,673,087 | A | 6/1987 | Webb | |
| 4,674,645 | A | 6/1987 | Instone | |
| 4,697,529 | A | 10/1987 | Kero | |
| 4,796,539 | A | 1/1989 | Berrett | |
| 4,811,540 | A | 3/1989 | Kallies | |
| 4,824,050 | A | 4/1989 | Courter | |
| 4,887,731 | A | 12/1989 | Pett | |
| 4,917,255 | A | 4/1990 | Foy | |
| 4,930,632 | A | 6/1990 | Eckert | |
| 4,937,125 | A * | 6/1990 | Sanmartin | B32B 3/12 428/116 |
| 4,949,986 | A | 8/1990 | Gohier | |
| 4,960,209 | A | 10/1990 | Tudor | |
| 4,982,859 | A | 1/1991 | Colebrook | |
| 4,986,596 | A | 1/1991 | Gohier | |
| 5,036,976 | A | 8/1991 | Sechler | |
| 5,092,251 | A | 3/1992 | Hamaker | |
| 5,092,541 | A | 3/1992 | Tofflemire | |
| 5,094,356 | A | 3/1992 | Miller | |
| 5,147,039 | A | 9/1992 | Sechler | |
| 5,194,462 | A * | 3/1993 | Hirasaka | B29C 70/12 428/299.4 |
| 5,205,571 | A | 4/1993 | Geier | |
| 5,230,434 | A | 7/1993 | Patrick | |
| 5,279,436 | A | 1/1994 | Elliott | |
| 5,381,915 | A | 1/1995 | Yardley | |
| 5,388,702 | A | 2/1995 | Jones | |
| 5,390,775 | A | 2/1995 | Herrick | |
| 5,398,831 | A | 3/1995 | Avramides | |
| 5,408,937 | A | 4/1995 | Knight, IV | |
| 5,450,977 | A | 9/1995 | Moe | |
| 5,501,333 | A | 3/1996 | Swan | |
| 5,508,085 | A * | 4/1996 | Lockshaw | B32B 3/12 156/166 |
| 5,531,327 | A | 7/1996 | Darby | |
| 5,542,777 | A * | 8/1996 | Johnson | B61D 17/043 403/384 |
| 5,545,458 | A * | 8/1996 | Fukushima | B32B 3/12 428/117 |
| 5,596,933 | A | 1/1997 | Knight | |
| 5,653,075 | A * | 8/1997 | Williamson | E04C 2/246 52/309.9 |
| 5,725,118 | A | 3/1998 | Slager | |
| 5,730,295 | A | 3/1998 | Darby | |
| 5,735,092 | A * | 4/1998 | Clayton | B32B 5/18 52/309.9 |
| 5,791,262 | A | 8/1998 | Knight | |
| 5,806,264 | A * | 9/1998 | Boot | E04C 2/382 52/405.1 |
| 5,875,996 | A | 3/1999 | Borgia | |
| 5,928,735 | A * | 7/1999 | Padmanabhan | B32B 21/08 428/297.4 |
| 6,030,159 | A | 2/2000 | Herrick | |
| 6,044,604 | A * | 4/2000 | Clayton | E04C 2/246 52/309.9 |
| 6,170,689 | B1 | 1/2001 | Flesher | |
| 6,308,642 | B1 | 10/2001 | Branam | |
| 6,308,830 | B1 | 10/2001 | Richter | |
| 6,416,271 | B1 | 7/2002 | Pigott | |
| 6,622,640 | B2 | 9/2003 | Taylor | |
| 6,684,593 | B2 | 2/2004 | Brenneis | |
| 6,842,665 | B2 | 1/2005 | Karlen | |
| 6,957,613 | B2 | 10/2005 | Taylor | |
| 6,972,144 | B2 * | 12/2005 | Roth | B29C 70/50 428/114 |
| 7,021,017 | B2 | 4/2006 | Herron | |
| 7,118,314 | B2 | 10/2006 | Zhou | |
| 7,201,243 | B2 | 4/2007 | Konstant | |
| 7,217,453 | B2 * | 5/2007 | Johnson | B29C 70/086 428/292.1 |
| D544,675 | S | 6/2007 | Ishikawa | |
| 7,267,060 | B1 | 9/2007 | Moser | |
| 7,543,416 | B2 * | 6/2009 | Albertelli | B29C 63/0073 156/99 |
| 7,591,114 | B2 | 9/2009 | Herron, III | |
| 7,600,319 | B2 | 10/2009 | Loughry | |
| 7,642,470 | B2 | 1/2010 | Loughry | |
| 7,717,290 | B2 | 5/2010 | Gerding | |
| 7,750,251 | B2 | 7/2010 | Loughry | |
| 7,861,877 | B2 | 1/2011 | Higgins | |
| 8,215,083 | B2 * | 7/2012 | Toas | E04B 1/80 428/195.1 |
| 8,448,396 | B2 * | 5/2013 | Robertson | B32B 37/18 52/286 |
| 2001/0015043 | A1 | 8/2001 | Brenneis | |
| 2003/0041956 | A1 | 3/2003 | Pigott | |
| 2004/0040477 | A1 | 3/2004 | Neumann | |
| 2004/0130113 | A1 | 7/2004 | Iwanicki | |
| 2005/0103791 | A1 | 5/2005 | Gerding | |
| 2005/0152774 | A1 | 7/2005 | Pierce | |
| 2005/0223675 | A1 | 10/2005 | Herron | |
| 2005/0229820 | A1 | 10/2005 | Reynard | |
| 2006/0012140 | A1 | 1/2006 | Konsant | |
| 2006/0039771 | A1 | 2/2006 | Zhou | |
| 2007/0119120 | A1 | 5/2007 | Herron, III | |
| 2008/0010942 | A1 | 1/2008 | Normand | |
| 2009/0188181 | A1 | 7/2009 | Forbis | |
| 2009/0266275 | A1 | 10/2009 | Feeney | |
| 2010/0009119 | A1 | 1/2010 | Herron, III | |
| 2010/0176124 | A1 | 7/2010 | Gerding | |
| 2010/0199588 | A1 | 8/2010 | Herron, III | |
| 2010/0199590 | A1 | 8/2010 | Newling | |
| 2012/0312951 | A1 * | 12/2012 | Leedekerken | B65D 19/0002 248/346.02 |

FOREIGN PATENT DOCUMENTS

| | | | |
|---|---|---|---|
| NL | WO 2011093699 A1 * | 8/2011 | ......... B65D 19/0002 |
| WO | WO 2005/091832 | 10/2005 | |
| WO | WO 2006/137837 | 12/2006 | |
| WO | WO 2009/058003 | 5/2009 | |

* cited by examiner

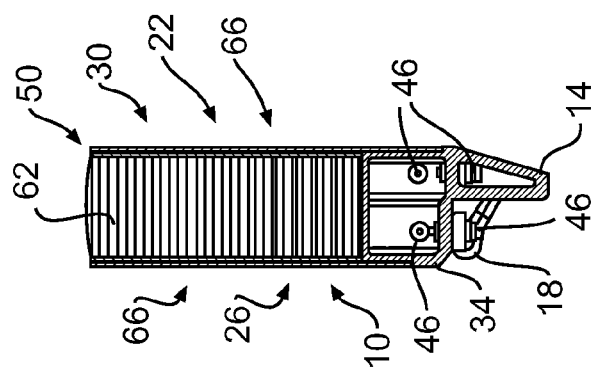
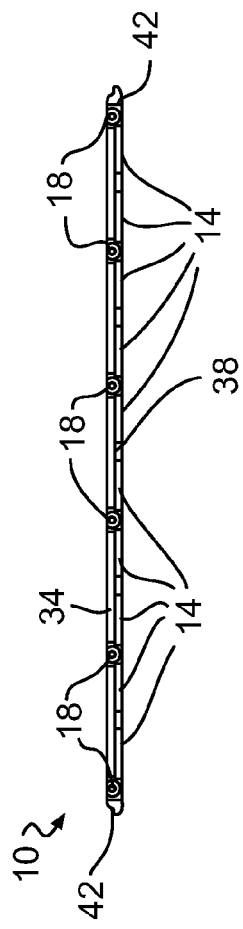
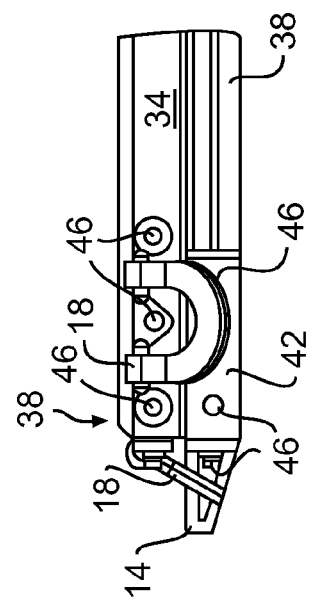
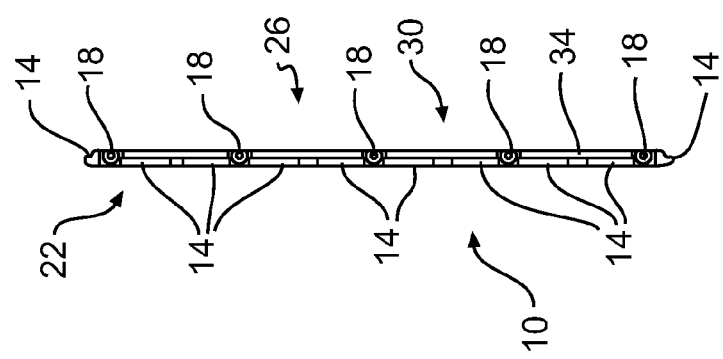

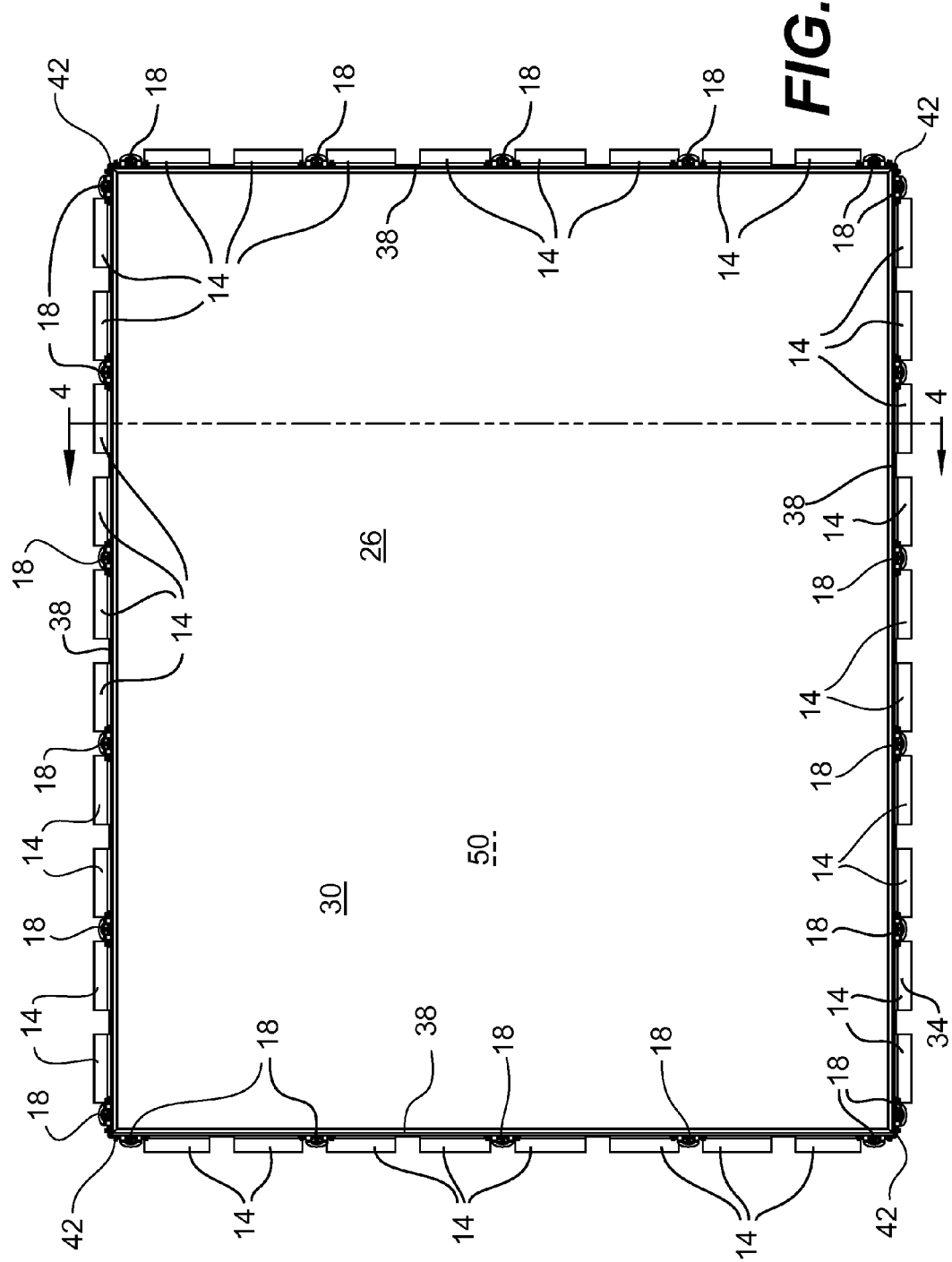

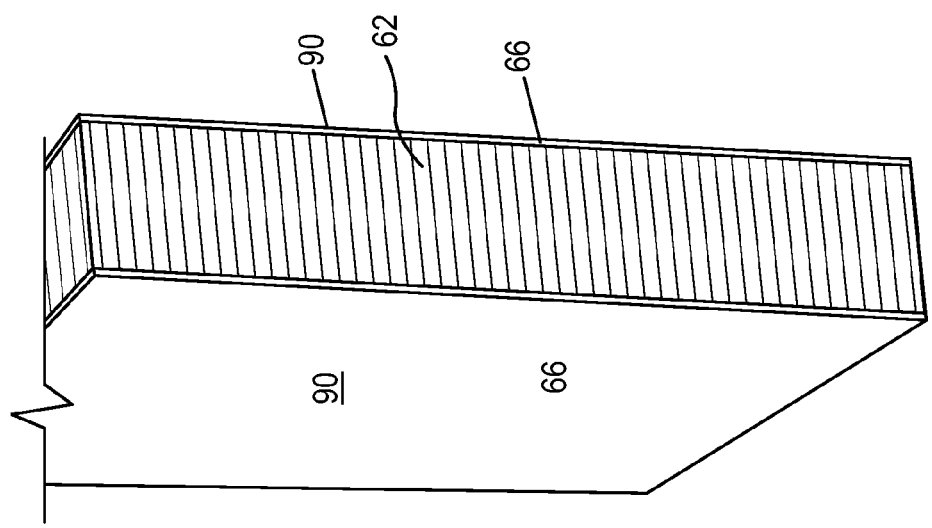
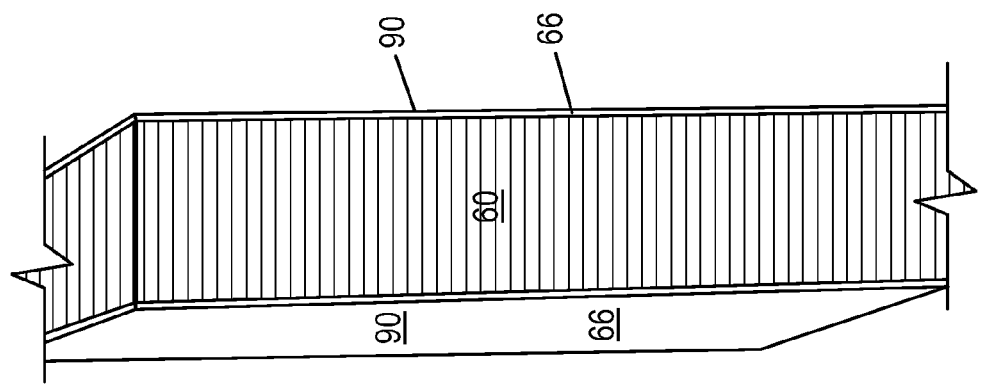
FIG. 12

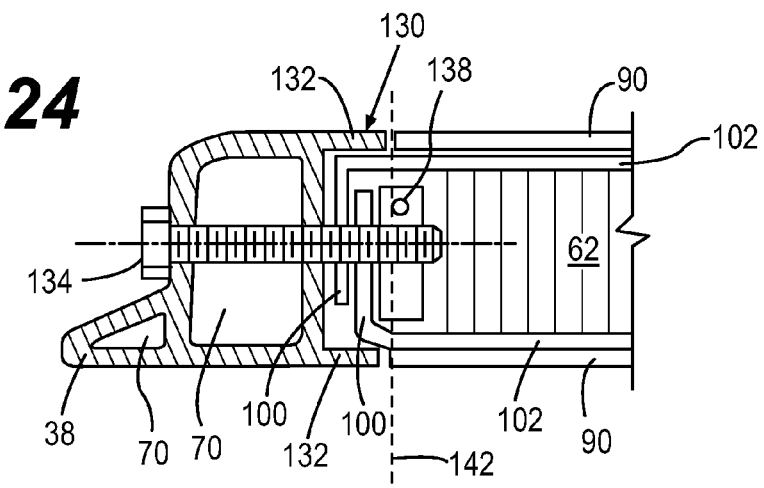
FIG. 24
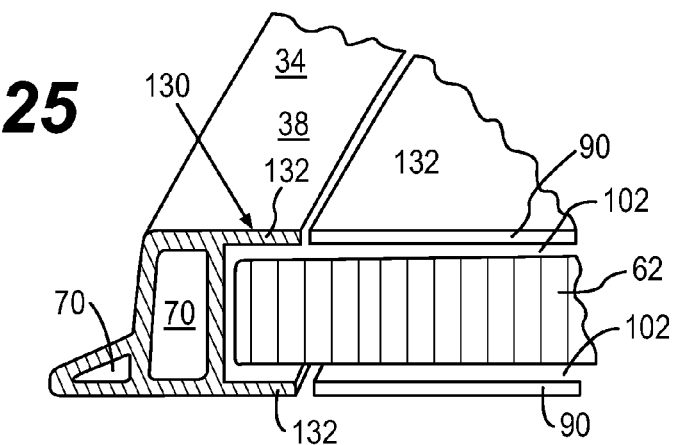
FIG. 25
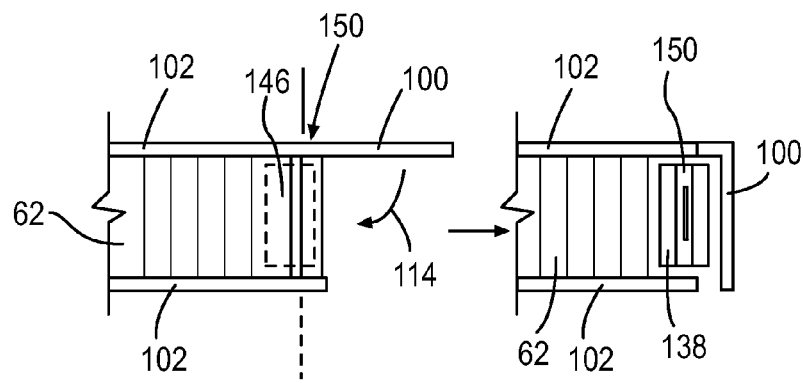
FIG. 26a)   FIG. 26b)

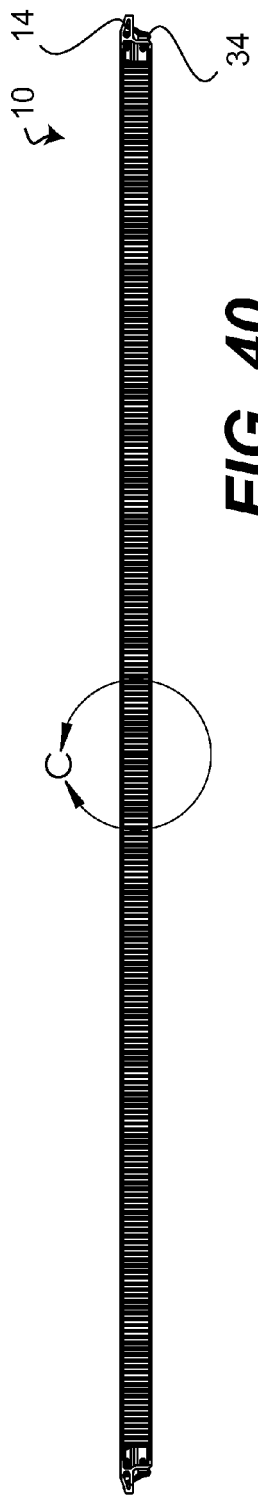
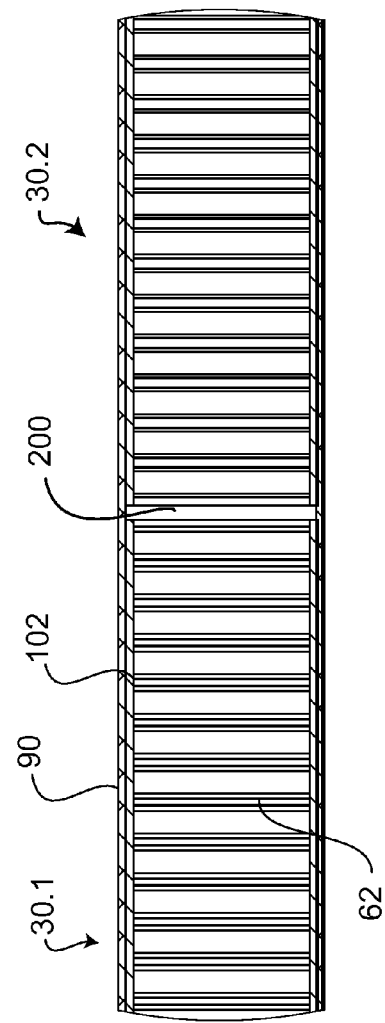
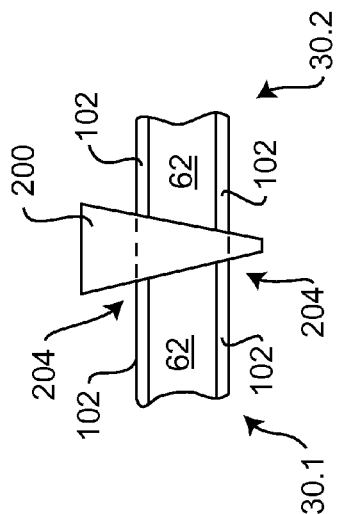
FIG. 40
FIG. 41
FIG. 42

CARGO PALLET AND METHOD OF MANUFACTURE THEREOF

CROSS-REFERENCE

The present invention relates to and claims priority from U.S. Provisional Patent Application No. 61/557,794 filed Nov. 9, 2011, entitled CARGO PALLET AND METHOD OF MANUFACTURE THEREOF, which is incorporated herein by reference in its entirety.

FIELD OF THE INVENTION

This invention relates generally to a cargo pallet for moving objects. More precisely, the present invention relates to a reinforced composite material cargo pallet construction and assembly.

BACKGROUND OF THE INVENTION

Cargo pallets are used in the transport industry to ship physical objects. They are generally used to secure physical objects thereon and provide a unified container format to handle. Cargo pallets carry physical objects in transit using various types of transportation. Cargo pallets are used in air cargo transportation where weight and stiffness is of significant importance. Legacy cargo pallets are made with materials that make them strong but heavy. It is therefore desirable to have a cargo pallet that is lighter to move and handle.

One way to lighten cargo pallets is to use composites materials in their construction. Composite materials offer a better strength/weight ratio than most isotropic materials do. Composites materials are lighter than metals (eg. aluminum) because they are designed to provide material to sustain mechanical loads applied thereon. Generally, composite material products are strong in their overall chemical structure.

The use of composite materials in cargo pallets raises some challenges. The junction between the cargo pallet frame, generally made of aluminum to sustain dents and shocks, and the remaining structure made of composite materials face a series of challenges to prevent weakening of the composite materials and to create a strong and durable structure. Maintenance and repairs that might be desirable over the life of a cargo pallet raise another set of considerations.

Physical tests are performed on cargo pallets to ensure they meet each mandatory requirement. Some tests are adapted to verify if the cargo pallet resists impacts and supports a predetermined load. For example, aerospace standards require a cargo pallet to sustain direct local loads/stresses applied to some portions of the cargo pallet. The cargo pallet needs to sustain lifting significant loads and resists accelerations of many G-forces (1G being one time the Earth's gravity) without suffering significant damages.

It is therefore desirable to find an improved composite material cargo pallet over the existing art. It is also desirable to find a composite material that is prone to support loads that must be supported by a cargo pallet. It is also desirable to provide an improved cargo pallet frame structure junction with composite materials portions to ensure a strong assembly and a significant cargo pallet useful life.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments that is presented later.

Therefore, the present invention improves at least some of the deficiencies associated with the drawbacks identified above in accordance with at least one embodiment of the present invention.

The present invention provides a cargo pallet including composite materials therein in accordance with at least one embodiment of the present invention.

The present invention provides a cargo pallet comprising a floor portion including composite material made of a plurality of parts joint together by sheet members in accordance with at least one embodiment of the present invention.

The present invention provides a cargo pallet comprising a frame portion including a plurality of tabs assembled or removably attached thereon in accordance with at least one embodiment of the present invention.

The present invention provides a cargo pallet including composite materials with a composite structure that is adapted to better sustain concentrated loads in accordance with at least one embodiment of the present invention.

The present invention provides a cargo pallet floor structure including composite materials adapted to replace a balsa core in accordance with at least one embodiment of the present invention.

The present invention provides a variety of means to distribute stresses applied to a composite wall of a cargo pallet in accordance with at least one embodiment of the present invention.

The present invention provides a reinforced junction portion between a frame portion and a composite floor portion of a cargo pallet that comprises a reinforcement member embedded therein in accordance with at least one embodiment of the present invention.

The present invention provides a cargo pallet including a floor portion including composite material therein, the floor portion being covered by a metallic sheet member sized and designed to be strongly secured to the frame portion to increase its resistance to mechanical stress applied thereon and to distribute localized stresses in accordance with at least one embodiment of the present invention.

The present invention provides a cargo pallet provided with adhesive between the composite materials portions, the covering sheet portion and the frame portion to improve cohesion thereof in accordance with at least one embodiment of the present invention.

The present invention provides a cargo pallet comprising a frame including a plurality of frame members adapted to receive, in a cavity defined therein, a composite floor portion and at least one sheet of structural material in accordance with at least one embodiment of the present invention.

The present invention provides inserts disposed in a composite floor portion that are locally increasing the strength of the composite floor portion and facilitate the assembly of a frame thereto in accordance with at least one embodiment of the present invention.

The present invention provides a reinforced composite floor portion structure adapted to be used in the construction of a cargo pallet that is using a skin fiber layer fused with a core portion (e.g. honeycomb core) of the composite floor core portion that increases the mechanical junction between the skin fiber layer and the core portion in accordance with at least one embodiment of the present invention.

The present invention provides a method of manufacturing a reinforced composite floor portion adapted to be used in the construction of a cargo pallet that is using a skin fiber layer that is heated and partially melted before being compressed with a core portion that is also heated and partially melted to be fused with the skin fiber layer of the composite floor core portion that increases the mechanical junction between the skin fiber layer and the core portion in accordance with at least one embodiment of the present invention.

The present invention provides a structure and a method of manufacturing a reinforced composite floor portion adapted to be used in the construction of a cargo pallet that is using an extended fiber portion of the composite floor portion to a surface and to cover edges of the composite floor core portion that increases the shear resistance between the composite floor portion and the frame in accordance with at least one embodiment of the present invention.

The present invention provides a structure and a method of manufacturing a reinforced composite floor portion adapted to be used in the construction of a cargo pallet that is using a skin fiber layer including about 60% unidirectional fiberglass and about 40% polypropylene disposed and secured to at least one face of the floor in accordance with at least one embodiment of the present invention.

The present invention provides a composite cargo pallet structure that has limited humidity absorption and is fungus resistant in accordance with at least one embodiment of the present invention.

The present invention provides a composite cargo pallet that is adapted to limit liquid inclusion when there is an opening performed in the structure in accordance with at least one embodiment of the invention.

The present invention provides a composite cargo pallet that substantially retains its dry weight even if used in a humid or wet environment in accordance with at least one embodiment of the invention.

The present invention provides a termite-resistant cargo pallet in accordance with at least one embodiment of the invention.

The present invention provides a substantially dimension-stable cargo pallet upon significant humidity variation in accordance with at least one embodiment of the present invention.

The present invention provides a method of repairing a composite cargo pallet so that it substantially retains its dry weight even if used in a humid or wet environment after it has been punctured in accordance with at least one embodiment of the invention.

The present invention provides a cargo pallet comprising a composite floor portion including a core and layers of composite material respectively disposed on opposed sides of the core, the layers of composite material being adapted to be fused with the core portion to establish a strong connection therebetween.

The present invention provides method of assembling a cargo pallet, the method comprising heating at least one side of a core; heating one side of a composite layer; and assembling the at least one heated side of the core with the heated side of the composite layer to fuse the core with the composite layer into a composite floor portion.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 1 is a side elevation view of cargo pallet in accordance with an embodiment of the present invention;

FIG. 2 is a top plan view of cargo pallet in accordance with an embodiment of the present invention;

FIG. 3 is a side elevation view of cargo pallet in accordance with an embodiment of the present invention;

FIG. 5 is a magnified side elevation view of a portion of a cargo pallet in accordance with an embodiment of the present invention;

FIG. 6 is a magnified side elevation section view of a portion of a cargo pallet in accordance with an embodiment of the present invention;

FIG. 12 is a section view of a composite floor portion of a cargo pallet comprising a balsa core (left) and a honey comb core (right) in accordance with an embodiment of the present invention;

FIG. 24 is a magnified schematic section of a frame and composite floor portion with a fiber layers, core and frame assembly of a cargo pallet in accordance with an embodiment of the present invention;

FIG. 25 is a magnified schematic section of a frame and composite floor portion with a fiber layers, core and frame assembly of a cargo pallet in accordance with an embodiment of the present invention;

FIGS. 26 a) and b) are magnified schematic sections of a frame and composite floor portion with a fiber layers, core, inserts and frame assembly of a cargo pallet in accordance with embodiments of the present invention;

FIG. 40 illustrates an elevational section view of a cargo pallet including a plurality of assembled floor portions in accordance with an embodiment of the invention;

FIG. 41 illustrates a magnified portion of a section view of a cargo pallet including a plurality of expanded floor portions in accordance with an embodiment of the invention; and FIG. 42 is a schematic view of an expansion member disposed between two floor portions in accordance with an embodiment of the invention.

DESCRIPTION OF EMBODIMENT(S) OF THE INVENTION

Figure 4:
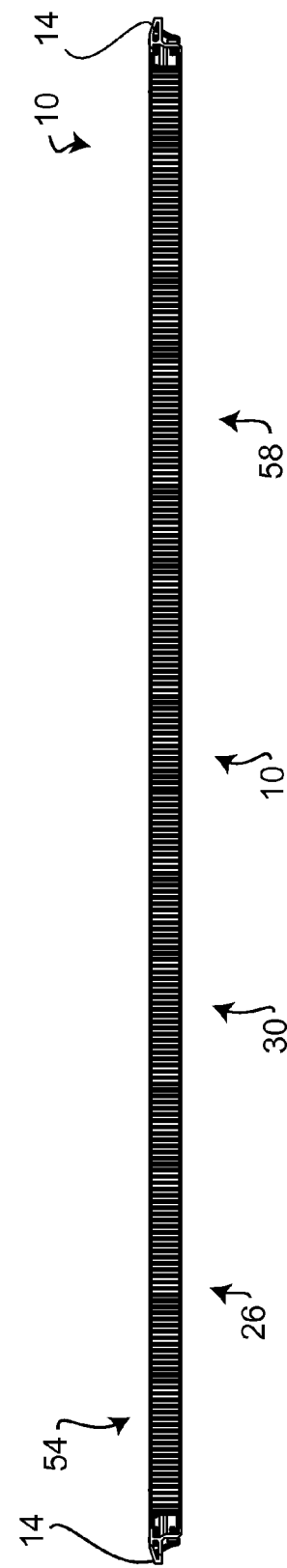
FIG. 4 is a side elevation section view of cargo pallet in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in a schematic form in order to facilitate the description of the present invention.

A cargo pallet adapted to be used, for example, in the aeronautical industry is illustrated in FIGS. 1 through FIG. 4. FIG. 1 is a side elevation view of an exemplary cargo pallet 10. The cargo pallet 10 has a relatively planar shape adapted to receive and secure thereon physical objects to be transported. The cargo pallet 10 periphery is equipped with a series of laterally extending tabs 14 and a plurality of anchoring elements 18. The laterally extending tabs 14 are generally used to reinforce the cargo pallet 10 and also to act as a ramp, or a "ski-like" edge, when the cargo pallet 10 is moved on the ground or on the floor. The tabs 14 are also used to secure the pallet 10 on the floor of the vehicle, particularly the floor of an aircraft having proper standard securing equipment, during transportation. Tabs 14 are spaced apart from one another to allow securing anchoring elements 18 therebetween. The anchoring elements 18 are illustratively equidistantly disposed on the cargo pallet 10 in an exemplary configuration adapted to secure physical objects on the cargo pallet 10 from various directions thereof.

The cargo pallet 10 includes a bottom surface 22, adapted to face the ground, and an upper surface 26, as best seen in FIG. 2, adapted to face up, support and secure thereon physical objects to be transported with the cargo pallet 10. The bottom surface 22 and the upper surface 26 are associated with a composite material floor 30 bordered by a frame 34. The frame 34 reinforces and protects the composite material floor 30 in addition to adding strength to the composite material floor 30. The frame 34 of the exemplary embodiments illustrated in FIG. 1 through FIG. 5 is composed of several individual frame members 38 secured together by a securing member 42. The frame members 38 of the illustrative embodiment are manufactured with an aluminum extrusion process and at using light weight aluminum. The securing member 42 and the anchoring elements 18 are secured to the frame with rivets 46 or fasteners (not illustrated in the Figures). The individual frame members 38 are assembled in the corners of the cargo pallet 10 in the illustrated embodiment and can be alternatively assembled differently in other embodiments.

The composite material floor 30 is made of several components 50 that will be discussed in details below. The section view of the composite material floor 30 illustrated in FIG. 4 depicts two illustrative portions 54, 58 where some components 50 are assembled to cover the entire surface of the composite material floor 30. It might be desirable to juxtapose some components 50 in the composite material floor 30 when components 50 are smaller than the entire surface of the floor 30 or when components 50 large enough to cover the entire surface of the floor 30 would likely be significantly more expansive. Using a plurality of components 50 would then likely be a less expansive option.

FIG. 6 depicts a section view of a portion of the cargo pallet 10. The bottom surface 22 and the upper surface 26 are separated by a foam core 60, or, preferably, a honeycomb core 62, and several layers of side materials 66 adapted to form a strong unitary structure. FIG. 6 also illustrates the fastening mechanism used to secure the anchoring element 18 to the frame 34. One can appreciated from the embodiment of FIG. 6 that rivets 46 are secured through a wall of the frame 34. FIG. 5 more clearly shows the securing member 42 riveted to two adjacent frame members 38 to hold the frame members 38 together.

Figure 7:
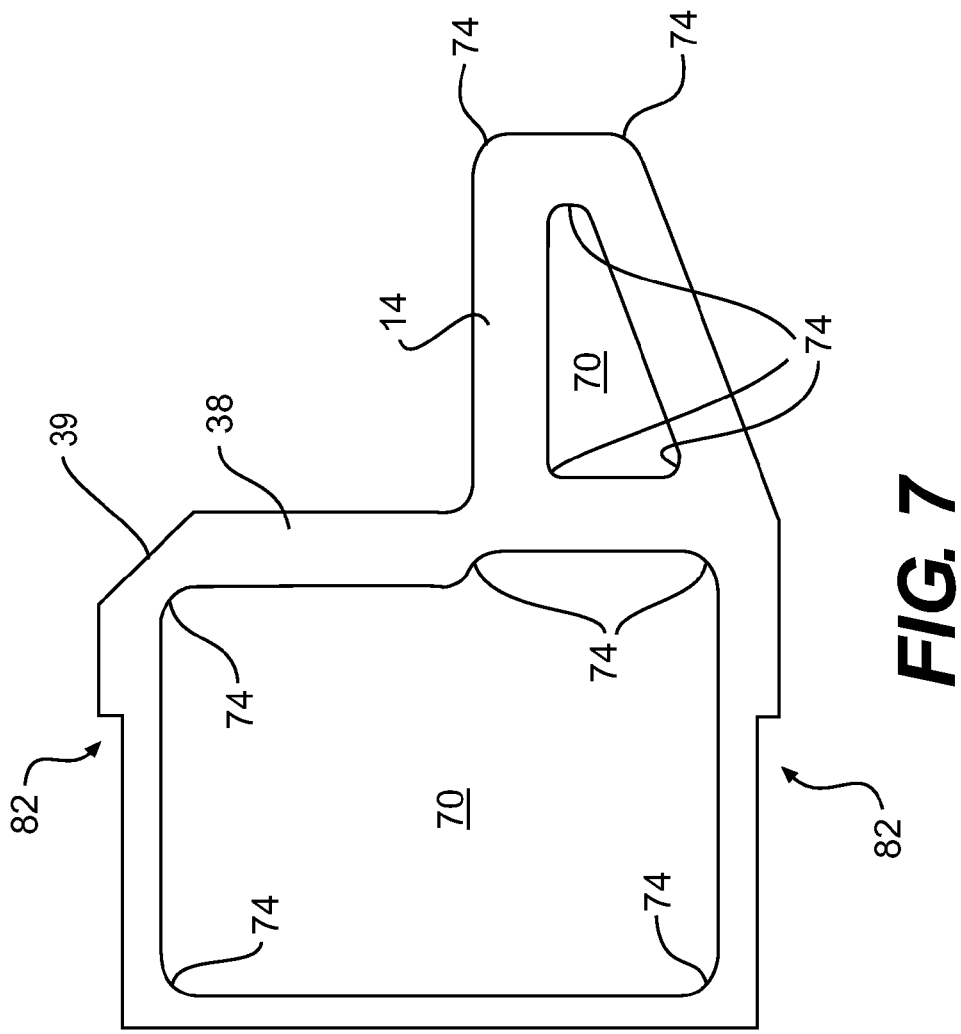
FIG. 7 is a magnified section of a frame portion of a cargo pallet in accordance with an embodiment of the present invention.

We turn now to FIG. 7 which shows a section view of a frame member 38. The embodied frame member 38 is manufactured with aluminum extrusion members and its shape includes hollowed portions 70 to reduce the amount of materials and provide a lightweight frame member 38. A series of radiuses 74 are used to prevent stress concentrations on various portions of the frame member 38. A chamfer 39 is also used to remove unnecessary material from the frame member 38. Two opposite walls are provided with recessed portions 82. These recessed portions 82 are adapted to receive side materials 66 therein while keeping an even thickness over the entire surfaces 22, 26 of the cargo pallet 10 and more particularly on the sides of the frame members 38 to prevent having any protruding edges thereof.

Figure 8:
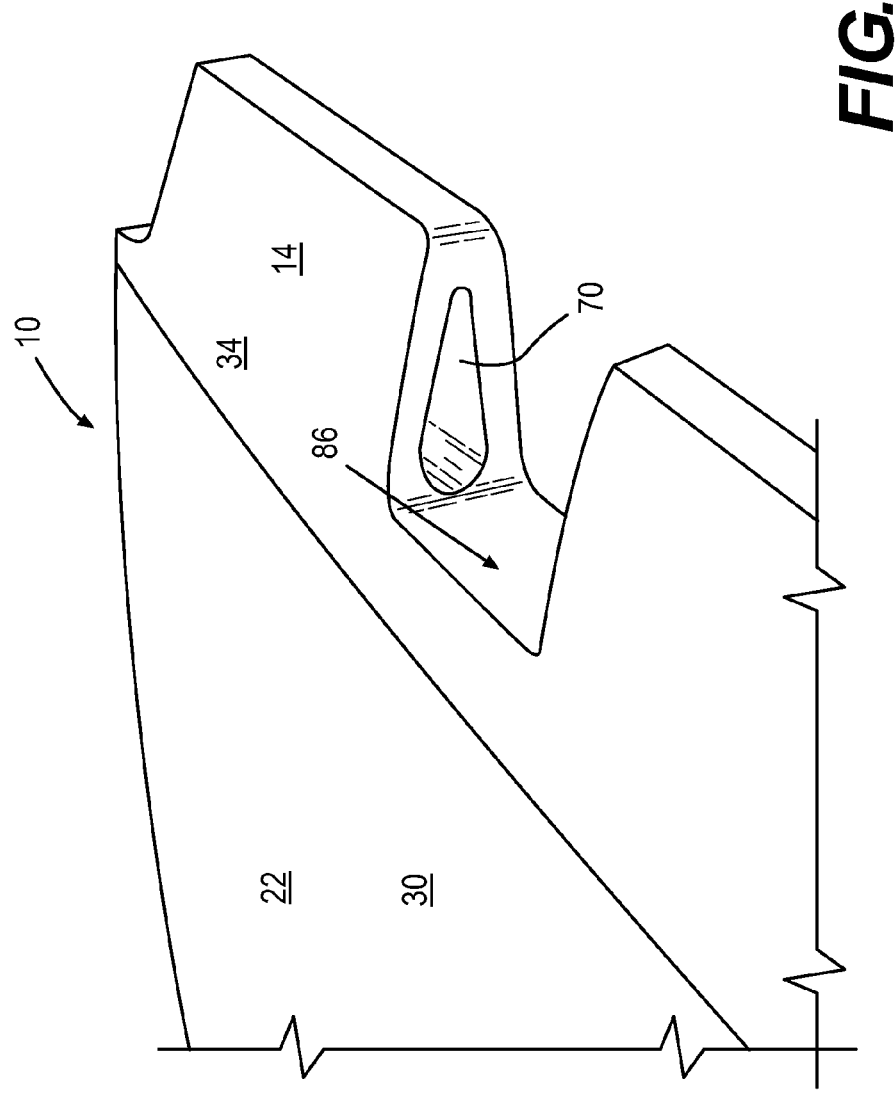
FIG. 8 is a perspective view of a portion of a frame of a cargo pallet in accordance with an embodiment of the present invention.
Figure 9:
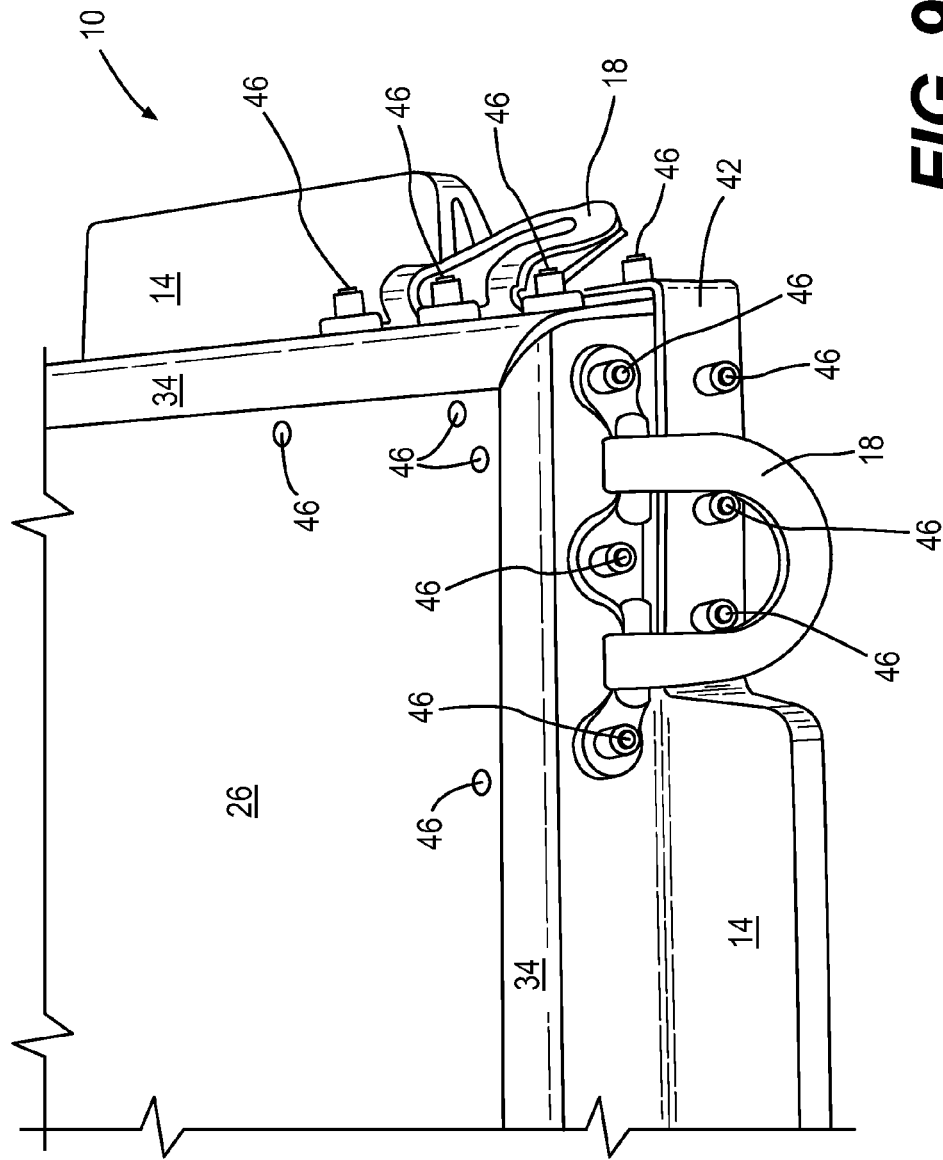
FIG. 9 is a perspective view of a portion of a frame of a cargo pallet in accordance with an embodiment of the present invention.
Figure 10:
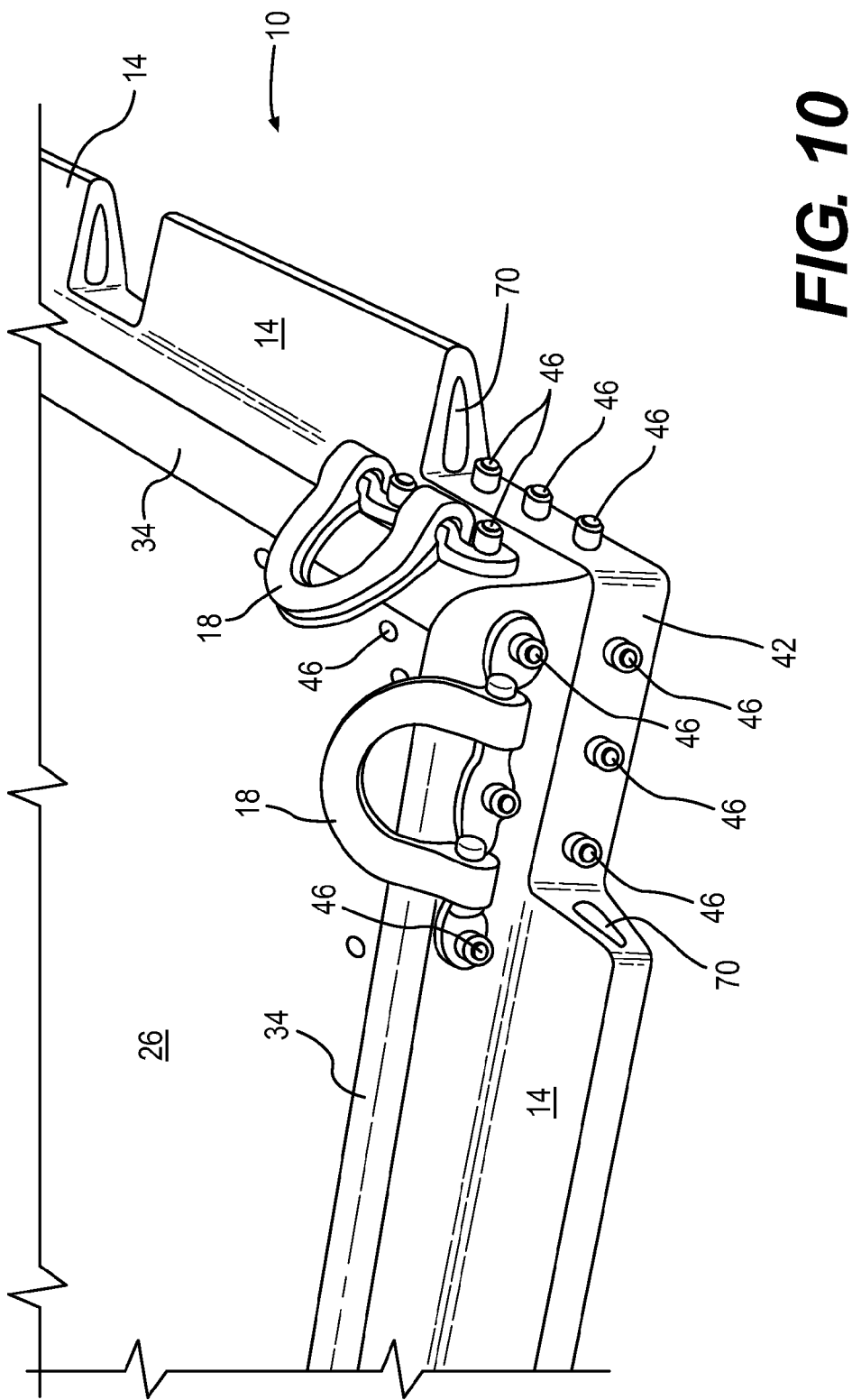
FIG. 10 is a perspective view of a portion of a frame of a cargo pallet in accordance with an embodiment of the present invention.
Figure 11:
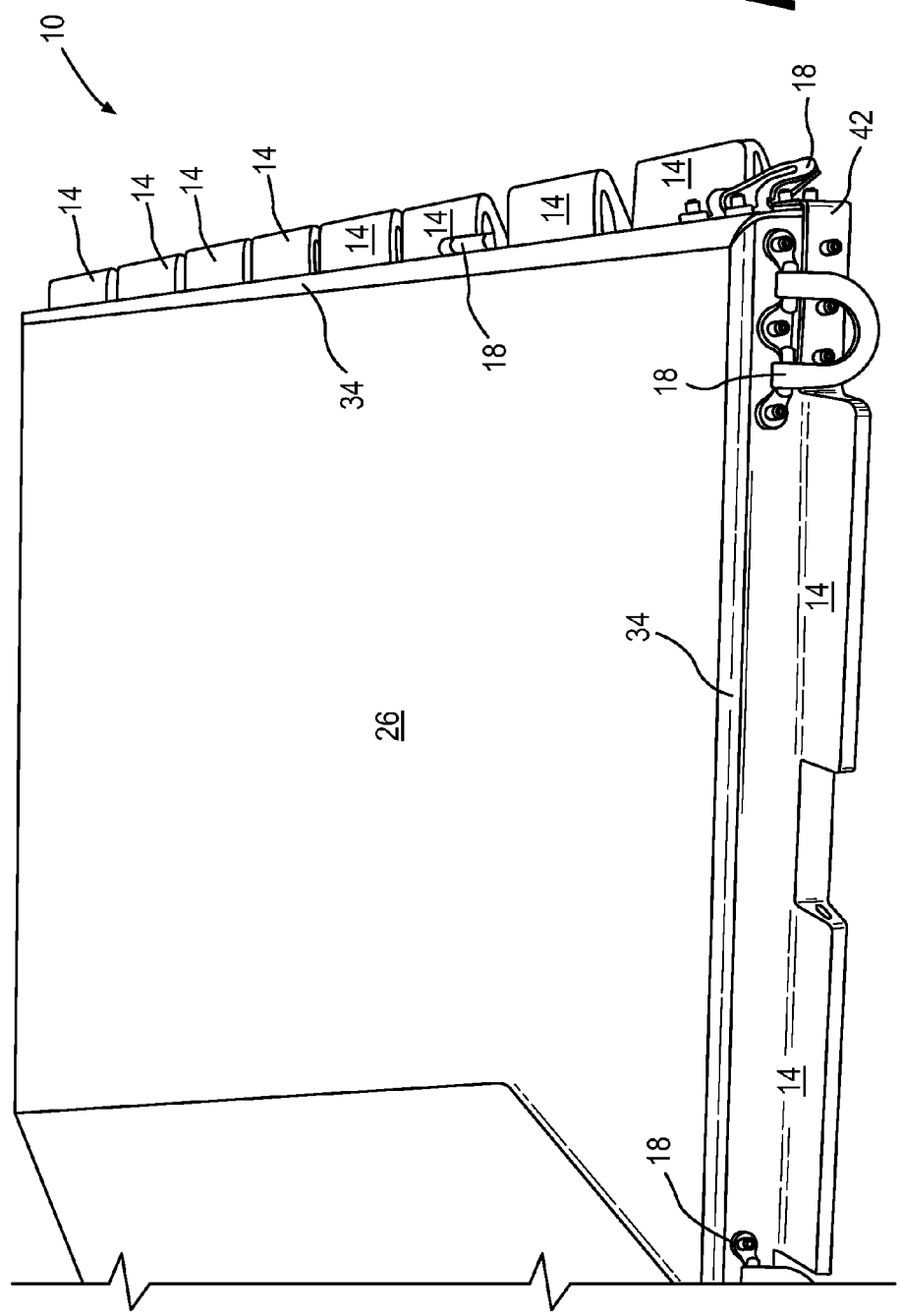
FIG. 11 is a perspective view of a frame of a cargo pallet in accordance with an embodiment of the present invention.

Tabs 14 are separated by openings 86 that are generally machined to further remove weight and define area over the sides of the cargo pallet to secure anchoring elements 18, not visible in FIG. 8, or other elements. FIG. 9 through FIG. 11 illustrate a corner of the cargo pallet 10 with magnified details thereof.

The "sandwich assembly" of a series of materials is illustrated in embodiments of FIG. 12. In the embodiment on the left one can appreciate a foam core 60 between two sheets of aluminum 90 used as side material 66. The embodiment on the right uses a honeycomb core 62 secured between two sheets of aluminum 90 used as side material 66 protecting the core 62 from shocks and dents. The embodiments presented in FIG. 12 are illustratively not using a plurality of side materials 66. A series of layers of various materials like fiberglass sheet, carbon fiber sheet or reinforced thermoplastic sheets are examples of materials usable therein. More complex arrangement of materials will be discussed below.

Figure 13:
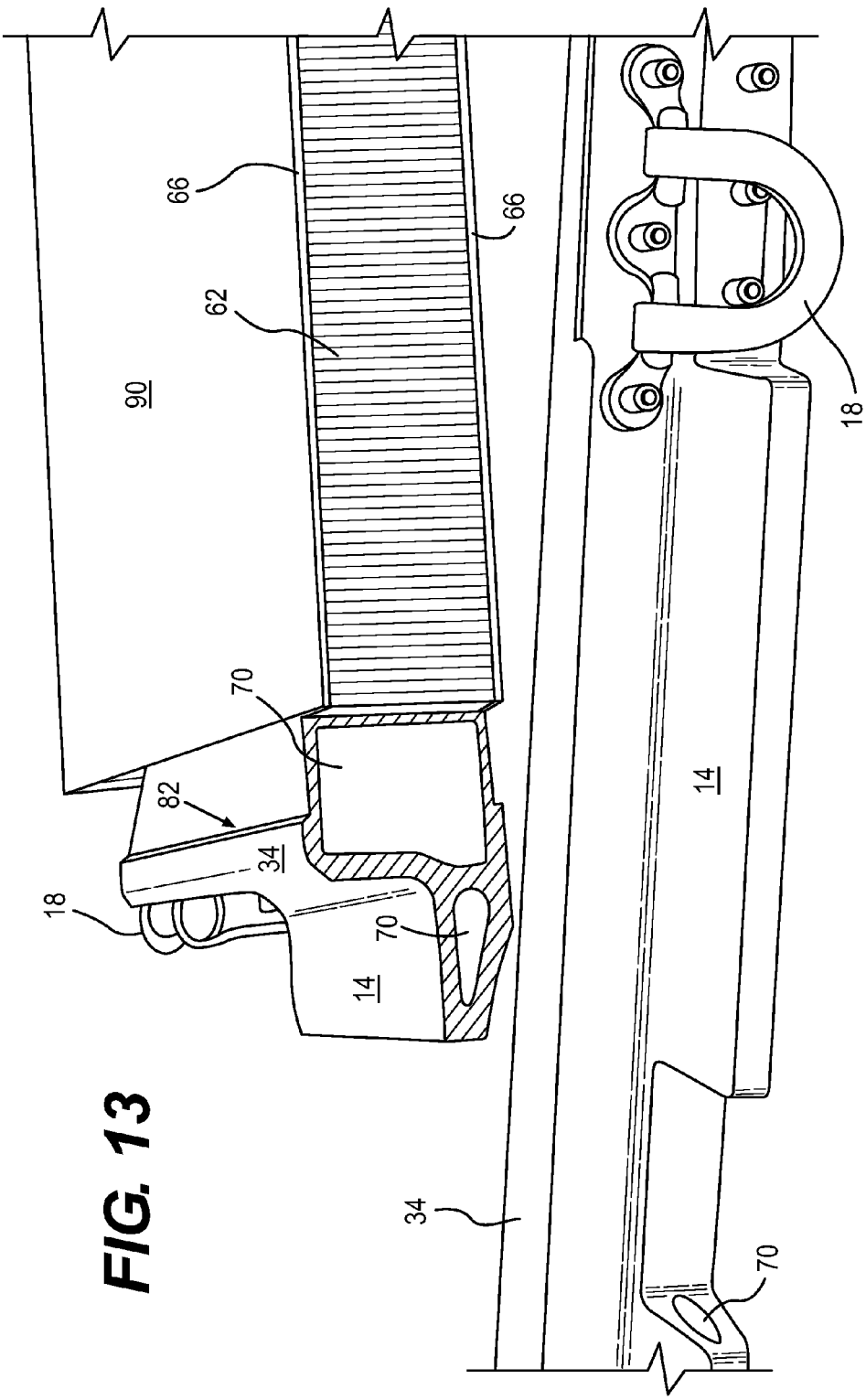
FIG. 13 is a magnified section of a cut frame and a portion of the exterior of a cargo pallet in accordance with an embodiment of the present invention.

The honeycomb core 62 used in embodiments therein has a property that prevents the honeycomb core 62 to absorb humidity and therefore prevents an increase in weight. The honeycomb core 62 does not significantly extend or retract in reaction to a temperature change. This is desirable to keep a significantly constant cargo pallet 10 dimension. Further, the honeycomb core 62 resists termites. This is not the case for a balsa (wood) core that also significantly adds on weight when influenced by humidity. An alternate section view of a frame 34 and floor 30 panel is illustrated in FIG. 13 where it is possible to see the interaction between the recessed portions 82 and the side material 66 of the floor 30 panel.

Figure 14:
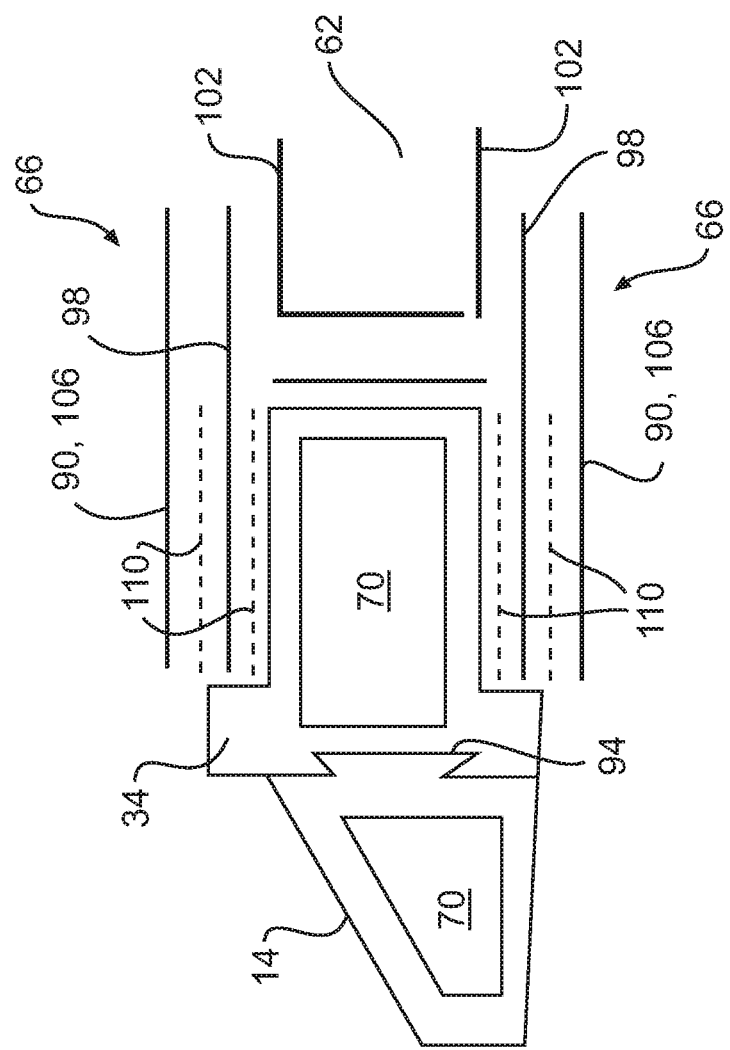
FIG. 14 is a magnified schematic section of a frame of a cargo pallet with a fiber layers, core and frame assembly in accordance with an embodiment of the present invention.

Moving now to FIG. 14, where an assembly embodiment having a tab 14 assembled to the frame 34, as opposed to the previous embodiments displaying tabs 14 that are formed with the frame 34, can be appreciated. The assembled tabs 14 are secured to the frame 34 with a dovetail 94. Alternatively, fasteners could replace the dovetail 94.

Figure 15:
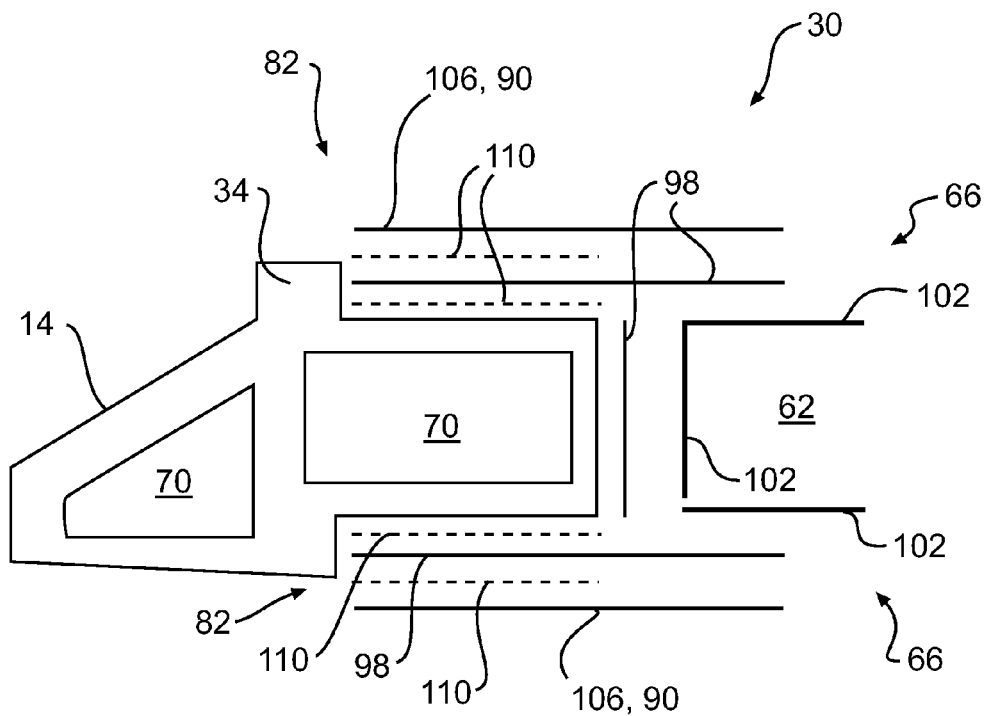
FIG. 15 is a magnified schematic section of a frame of a cargo pallet with a fiber layers, core and frame assembly in accordance with an embodiment of the present invention.
Figure 16:
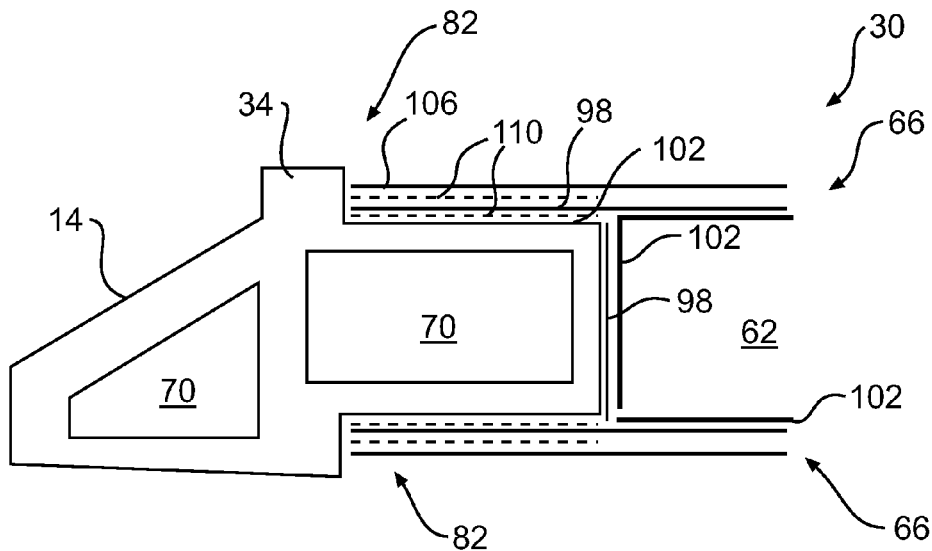
FIG. 16 is a magnified schematic section of a frame of a cargo pallet with a fiber layers, core and frame assembly in accordance with an embodiment of the present invention.
Figure 17:
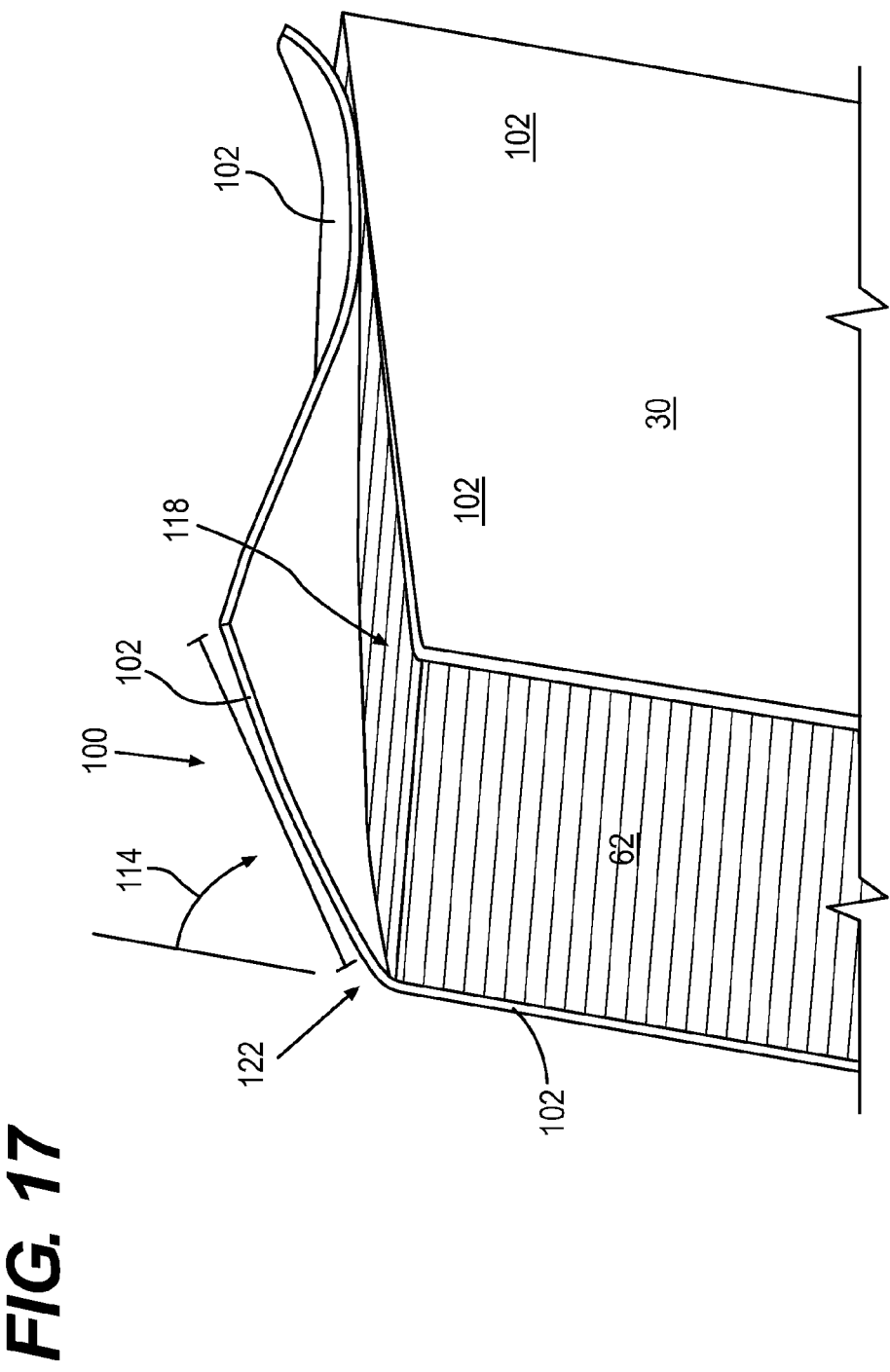
FIG. 17 is a perspective view of a composite floor portion of a cargo pallet with a fiber layers, core and frame assembly in accordance with an embodiment of the present invention.
Figure 18:
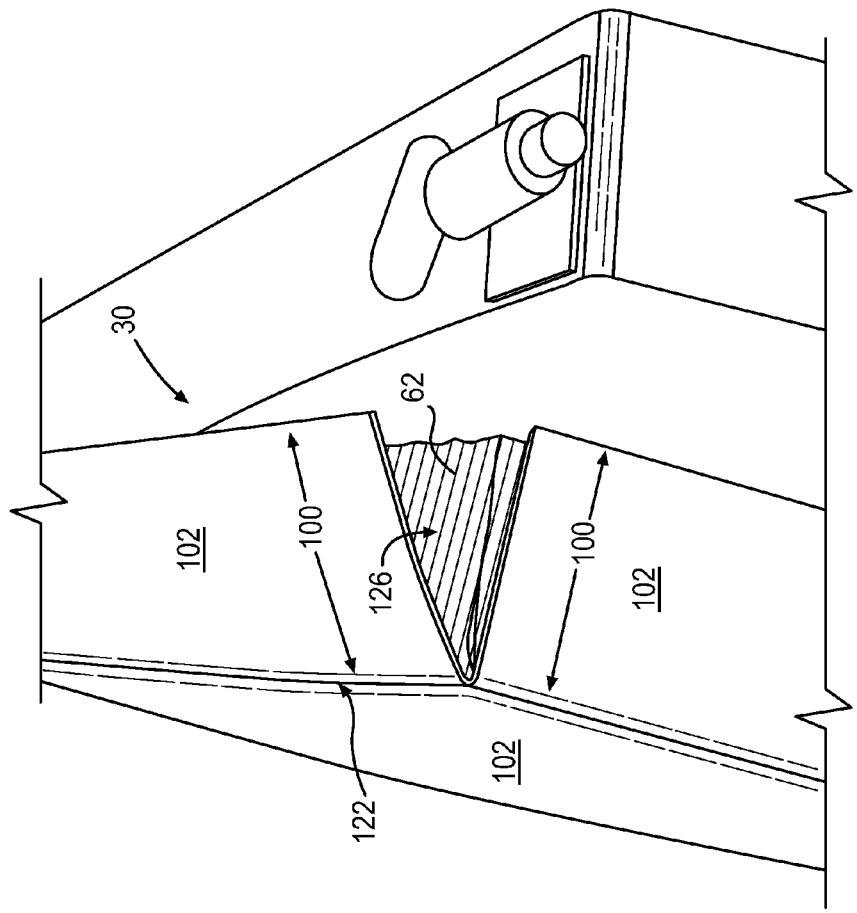
FIG. 18 is a perspective view of a composite floor portion of a cargo pallet with a fiber layers, core and frame assembly in accordance with an embodiment of the present invention.
Figure 19:
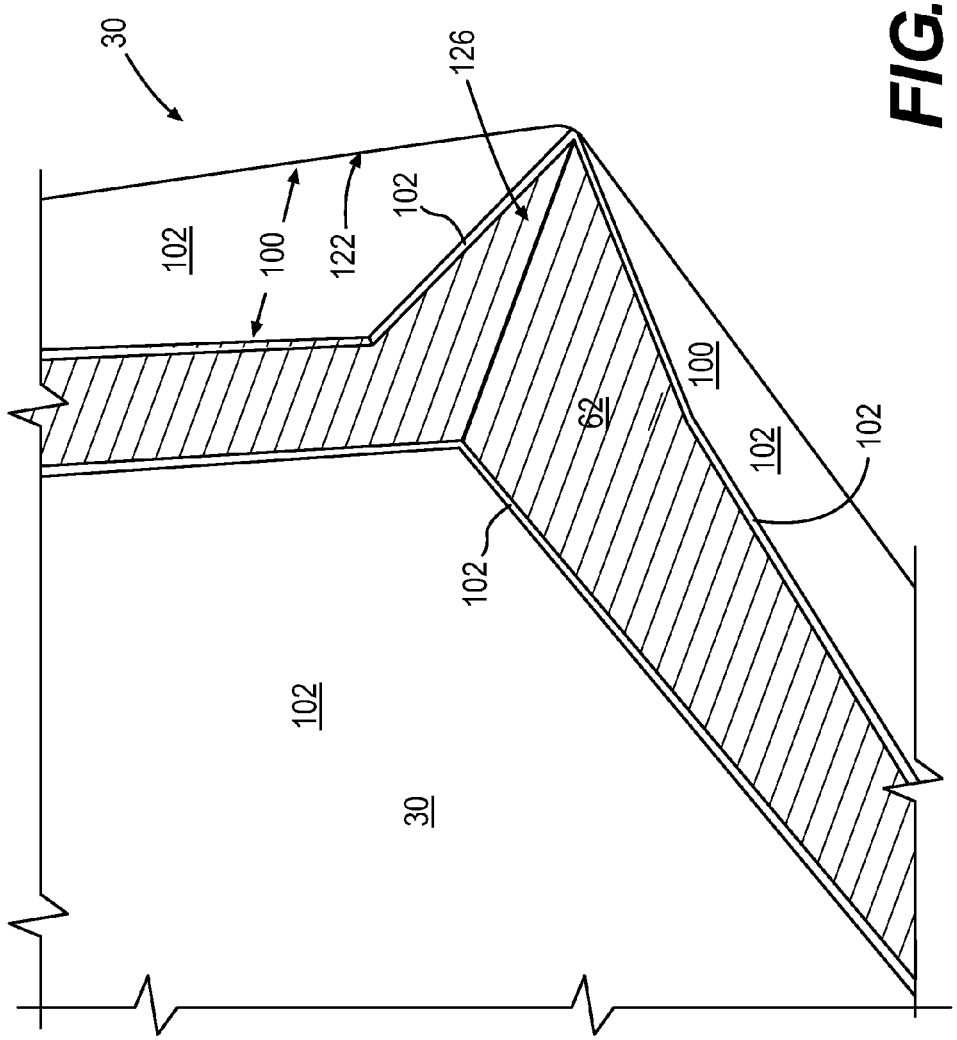
FIG. 19 is a perspective view of a composite floor portion of a cargo pallet with a fiber layers, core and frame assembly in accordance with an embodiment of the present invention.
Figure 20:
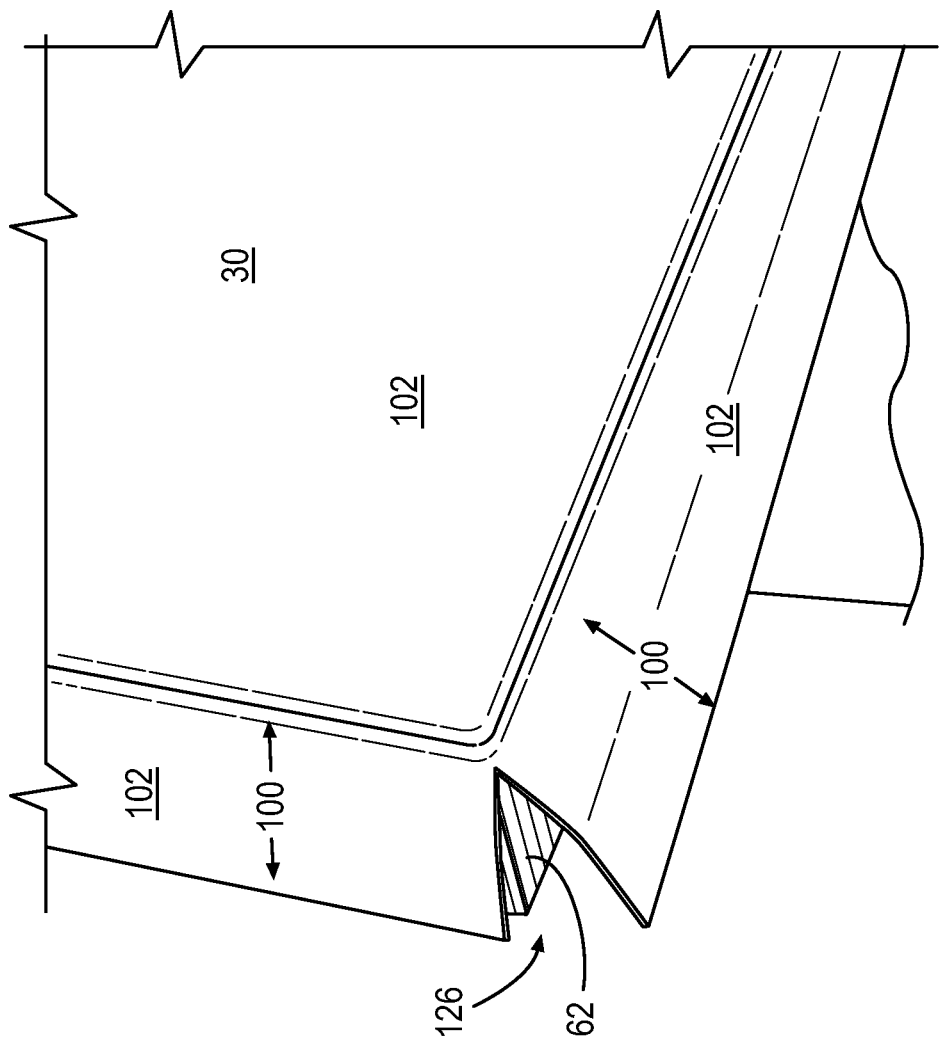
FIG. 20 is a perspective view of a composite floor portion of a cargo pallet with a fiber layers, core and frame assembly in accordance with an embodiment of the present invention.

FIGS. 15 and 16 illustrate an embodiment assembly including a honeycomb core 62 surrounded by a coat of adhesive 98, a layer of reinforced thermoplastic material 102, another coat of adhesive 98 and a layer of sheet metal 106 that can be a sheet of aluminum 90. All this assembled, compressed and cured as illustrated in FIG. 16 to provide a mechanically strong floor 30. The thermoplastic sheet material 102 could be replaced with fiberglass-polypropylene sheet material in another embodiment. Additionally, a layer of primer 110 can be applied between the sheet metal 106, the reinforced thermoplastic sheet material 102 and the aluminum frame 34 to fuse both materials and obtain superior strength.

The thermoplastic material 102 is generally applied on both sides of the floor 30 to increase its strength. As it can better be appreciated from FIG. 17 through FIG. 20, the thermoplastic material 102 can be assembled as a sheet material bonded on both sides of a honeycomb core 62. One embodiment provides an extended length 100 of the thermoplastic material 102 on one side of the honeycomb core 62 that can be folded 114 on the side portion 118 of the core 62. The length 100 of the continuous extended length of the thermoplastic material 102 is adapted to cover the entire side portion 118 of the core 62 in an embodiment. Other structural arrangements will be described in more details below.

Another embodiment uses two skin layers of fiberglass and polypropylene sheet fused on each side of a honeycomb core 62. The skin layer is heated and partially melted. The honeycomb core 62 is also heated and partially melted on each side. The skin layers are then assembled on each side of the honeycomb core 62 and compressed together to fuse the materials at their melted boundary. The fused assembly provides significant strength given the thus created material continuity. A plurality of skin layers can be used and assembled to provide additional strength.

The extended length of the thermoplastic material 102 adapted to cover the entire side portion 118 of the honeycomb core 62 is used to transfer the load and the shear forces between the honeycomb core 62 and the thermoplastic material 102 assembly to the frame 34. The extended sheet of thermoplastic material 102 is preferably disposed on the side of the floor 30 facing the ground such that a loaded cargo pallet 10 will increase tension on the extended sheet of thermoplastic material 102. The folded extended length 100 of thermoplastic material being strongly connected to an adjacent side of the frame 34 to transfer the load of the cargo pallet 10 in shear to the frame 34 increases the bond between the composite material floor portion 30 and the frame 34. The same extended length 100 can be provided on all sides of the honeycomb core 62 to equally transfer the load to their respective adjacent frame 34 as it can be appreciated in FIG. 18. It can be appreciated from the embodiment illustrated in FIG. 17 through FIG. 20 that the thermoplastic material 102 can be replaced by other fiber charged plastic, polypropylene or fiberglass and resin without departing from the scope of the present invention. A preferred ratio of an embodiment of the invention is about 60% fibers and about 40% polypropylene. Also, the folded extended length 100 of thermoplastic material 102 is forming a radius 122 with the planar surface of the floor 30 to prevent damaging fibers therein. A portion 126 of the thermoplastic material 102 is removed to only leave sufficient material to cover the side portions 118 of the honeycomb core 62.

Figure 21:
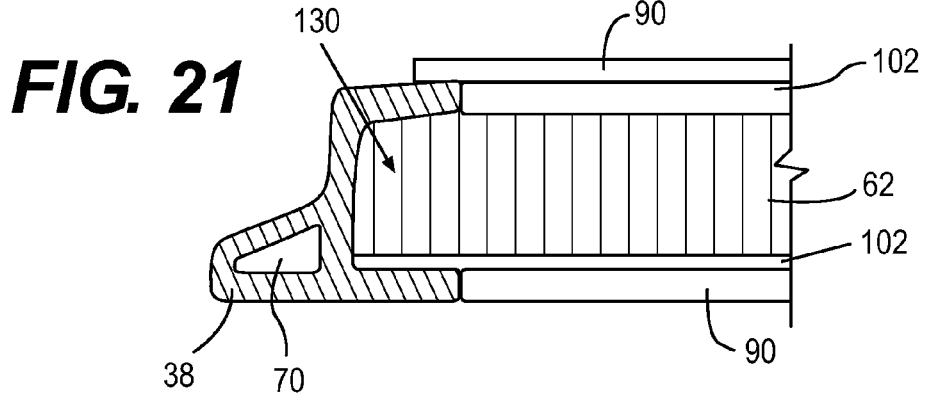
FIG. 21 is a magnified schematic section of a frame and composite floor portion with a fiber layers, core and frame assembly of a cargo pallet in accordance with an embodiment of the present invention.

Turning now to FIG. 21 where one can appreciate an additional possible embodiment of the invention having a honeycomb core 62 and a layer of thermoplastic material 102 inserted in a recess portion 130 defined in the frame member 38. Sheets of aluminum 90 are disposed on each side of the floor 30; one is abutting the frame member 38 and the other aluminum sheet 90 above is superposed to the frame 38. The recess portion 130 improves the load shear transfer between the honeycomb core 62 and the frame member 38.

Figure 22:
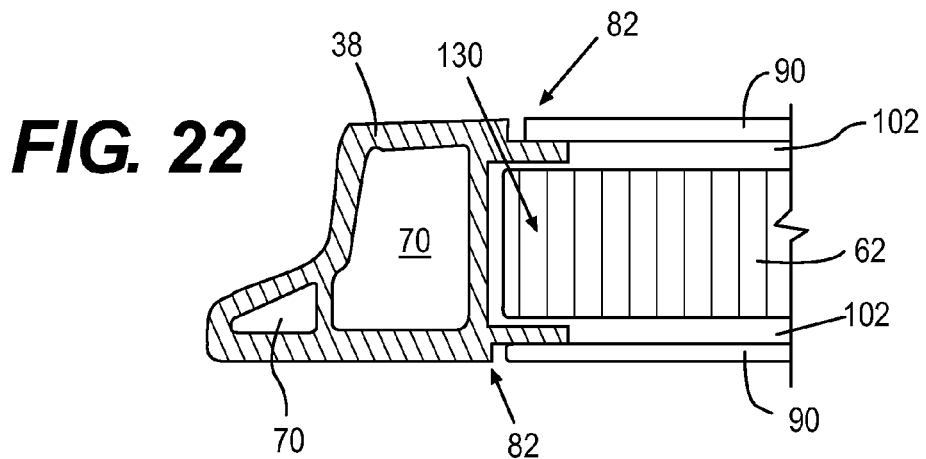
FIG. 22 is a magnified schematic section of a frame and composite floor portion with a fiber layers, core and frame assembly of a cargo pallet in accordance with an embodiment of the present invention.

Another embodiment is illustrated in FIG. 22 where the honeycomb core 62 and the two opposed layers of thermoplastic material 102 are inserted in the recess portion 130 while the two opposed sheets of aluminum 90 are disposed on opposite sides of the layers of thermoplastic material 102 and are received in respective recessed portions 82 of the frame member 38.

Figure 23:
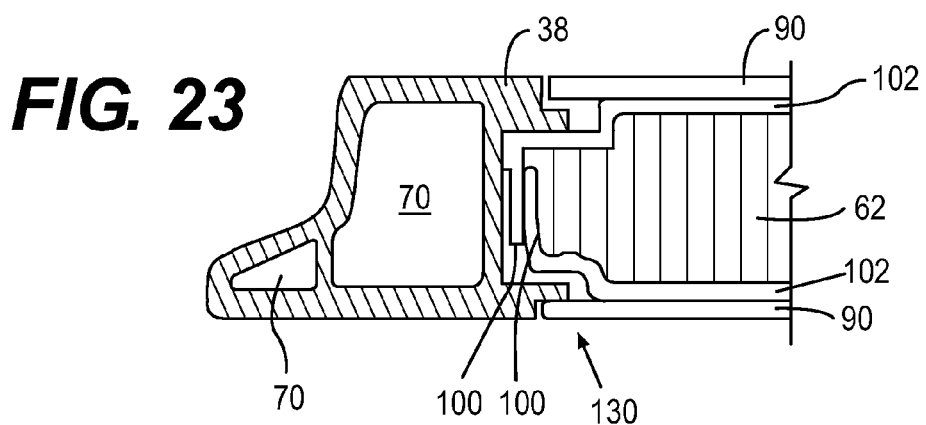
FIG. 23 is a magnified schematic section of a frame and composite floor portion with a fiber layers, core and frame assembly of a cargo pallet in accordance with an embodiment of the present invention.

Both layers of thermoplastic material 102 can have their respective folded extended length 100 of thermoplastic material 102, as illustrated in FIG. 23, in order to increase even more the load transfer between the honeycomb core 62 and the frame member 38. The folded extended lengths 100 are folded one on top of the other to both interconnect the two layers of thermoplastic material 102 together and seal the honeycomb core 62 with thermoplastic material 102.

FIG. 24 illustrates another possible embodiment substantially similar to the embodiment illustrated in FIG. 23. This time, however, an additional mechanical fastening of the honeycomb core 62 and the floor portion with the frame member 38 is presented. In so doing, a fastener 134 is inserted in a hole provided through the frame member 38 and the layers of thermoplastic material 102 to reach a receiving member 138 disposed within the layers of thermoplastic material 102 next (or embedded in) the honeycomb core 62. The fastener 134 is then capable to further mechanically secure the honeycomb core 62 and the layers of thermoplastic material 102 to the frame 38. The receiving member 138 can be made of either plastic material or metallic material suitable to sustain the strength applied thereto by the treads of the fastener 134. The receiving member 138 has an other role as it acts as a shear-resistant element given its position aligned with the shearing plane defined by the edge of the frame member 38. The receiving member 138 has a mechanical resistance to shear that is greater than the resistance of the honeycomb core 62; it offers additional resistance to the assembly. The receiving member 138 can have a different shape and size adapted to support the load applied to the cargo pallet 10. A plurality of fasteners 134 can be used on the periphery of the frame 34.

Both the layers of thermoplastic material 102 and the sheets of aluminum 90 can abut the protruding sides 132 of the frame member 38 while the honeycomb core 62 is inserted inside the recessed portion 130 of the frame member 38 as it is exemplified in FIG. 25.

FIG. 26 illustrates a honeycomb core 62 with a length 100 of thermoplastic material 102 equipped with an insert 146 therein. The insert 146 can be a piece of plastic, nylon, wood, aluminum or it can be made with other materials adapted to be secured with the honeycomb core 62; it offers a transversal reinforcement thereof between the two surfaces 22, 26 of the cargo pallet 10. This is desirable to add additional transversal strength to use fasteners (not illustrated in the Figure) to tie and secure a plurality of layers of the cargo pallet 10. The insert 146 can accommodate a hole 150 therein to allow a fastener therethrough. The fastener can be used through the frame 34, the thermoplastic material 102 to further secure the honeycomb core 62 to the frame 34 as it can be appreciated from FIG. 29.

Figure 27:
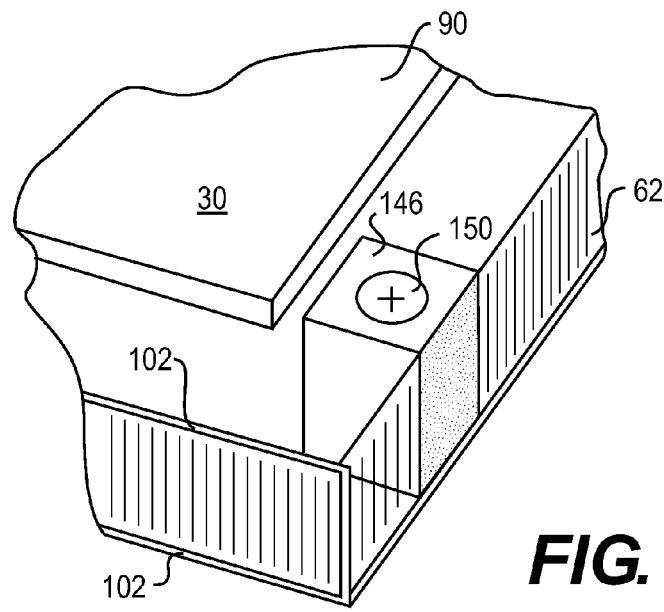
FIG. 27 is a magnified schematic section of a frame and composite floor portion with a fiber layers, core, inserts and frame assembly of a cargo pallet in accordance with an embodiment of the present invention.

FIG. 27 depicts an example of an insert 146 located in the honeycomb core 62 and adapted to be inserted with the surrounding honeycomb core 62 inside the recessed portion 130 of the frame 34 (not illustrated in FIG. 27). The hole 150 in the insert 146 will be used in that embodiment to secure the portion of the honeycomb core 62 and a portion of the thermoplastic material 102 to the frame 34 with a fastener (not illustrated). One can appreciate that the sheet of aluminum 90 ends before the side of the honeycomb core 62 and is adapted to abut the side of the protruding portion 130 extending from the frame 34 as it is visible in FIG. 29.

Figure 28:
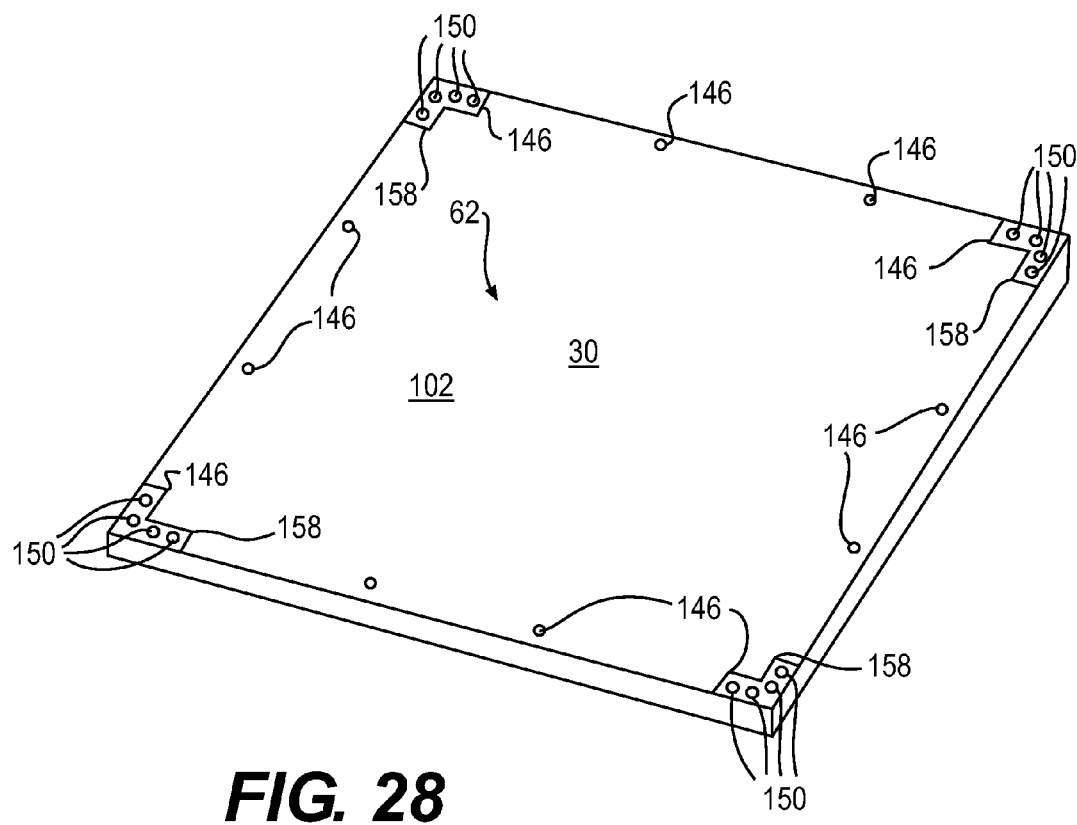
FIG. 28 is a magnified schematic section of a frame and composite floor portion with a fiber layers, core, inserts and frame assembly of a cargo pallet in accordance with an embodiment of the present invention.
Figure 29:
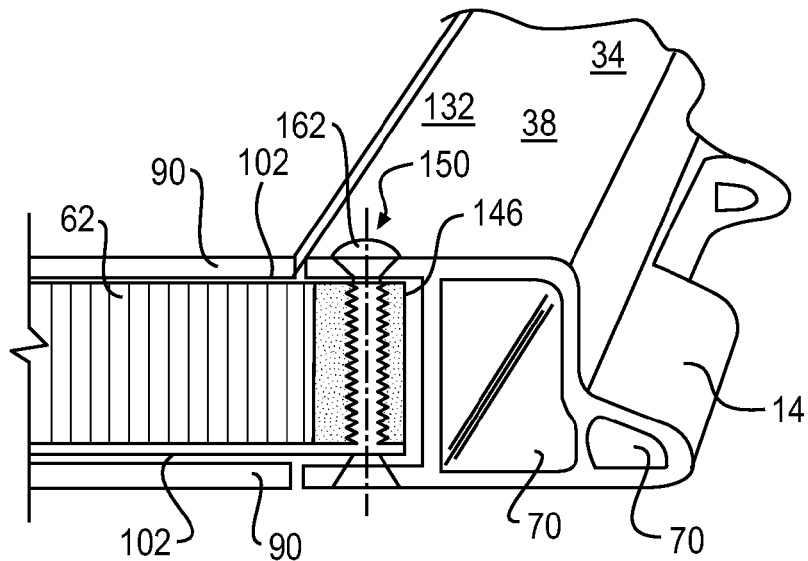
FIG. 29 is a magnified schematic section of a frame and composite floor portion with a fiber layers, core, inserts and frame assembly of a cargo pallet in accordance with an embodiment of the present invention.

FIG. 28 depicts an embodiment of the honeycomb core 62 and the thermoplastic material 102 sheets assembly with a plurality of inserts 146 therein. This layout is configured to be secured to a peripheral frame 34 with fasteners (not illustrated) all around the floor assembly 30. Layers of aluminum sheet material 90 can be added on each side of the floor 30 illustrated in FIG. 28. One can appreciated from FIG. 28 that the corners 154 of the floor assembly 30 are provided with inserts 146 having a different shape. The corner inserts 158 are shaped in "L" to ensure a good connection on both sides of the corner of the floor assembly 30 and are also including a plurality of holes 150 therein to receive a plurality of fasteners therethrough. FIG. 29 depicts a section view of an exemplary assembly with an insert 146 with a fastener 162 therein securing the frame 38 with the honeycomb core 62 and the associated layers of thermoplastic material 102.

Figure 30:
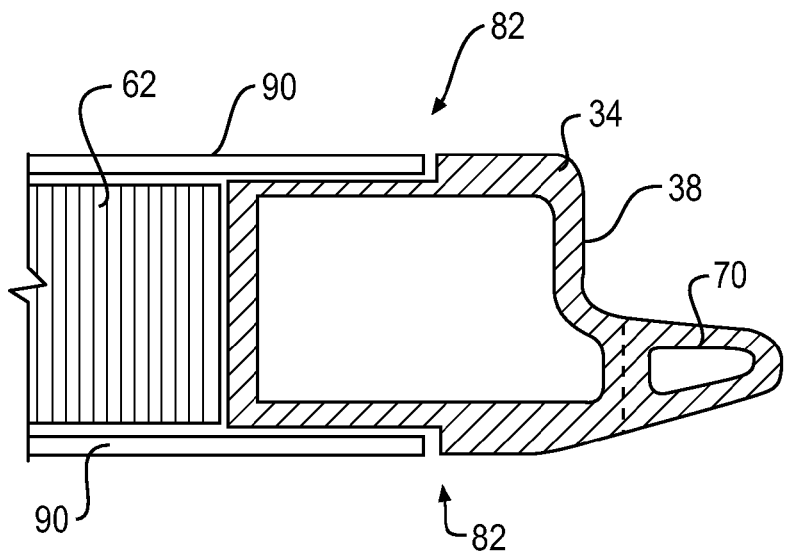
FIG. 30 is a magnified schematic section of a frame and composite floor portion with a fiber layers, core and frame assembly of a cargo pallet in accordance with an embodiment of the present invention.

FIG. 30 illustrates an embodiment of the invention using a frame 38 with recessed portions 82 on each side thereof adapted to accommodate the sheets of aluminum 90 disposed on each side thereof.

Figure 31:
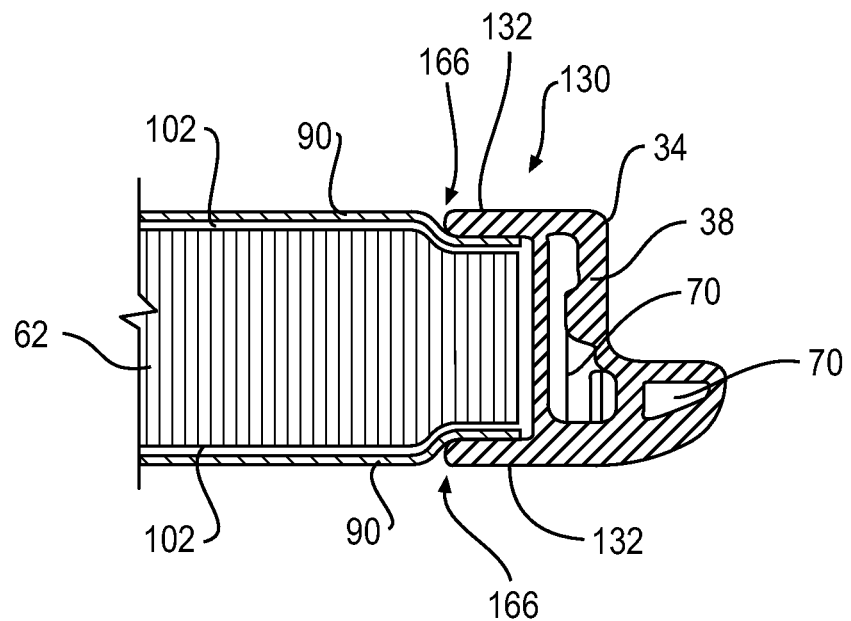
FIG. 31 is a magnified schematic section of a frame and composite floor portion with a fiber layers, core and frame assembly of a cargo pallet in accordance with an embodiment of the present invention.
Figure 32:
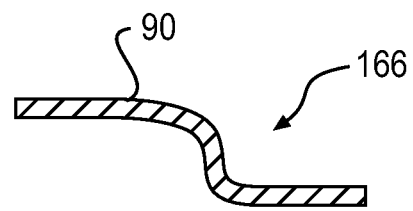
FIG. 32 is a magnified schematic section of an isolated skin layer of a cargo pallet in accordance with an embodiment of the present invention.

FIG. 31 illustrates an embodiment of the invention where the sheets of aluminum 90 are formed 166 with an embossed portion to fit into the recessed portion 130 of the frame 34. In this embodiment the honeycomb core 62 is also contracted at its end to provide enough space to fit the aluminum sheet 90, the thermoplastic material 102 sheet and the honeycomb core 62 assembly in the recessed portion 130 defined in the frame 38. It is possible to appreciate that the thermoplastic material 102 is also formed 166 to follow the assembly and allow an even exterior surface continuity between the aluminum sheet 90 and the exterior side of the frame 34. FIG. 32, in turn, illustrates an isolated formed portion 166 of the aluminum sheet 90.

Figure 33:
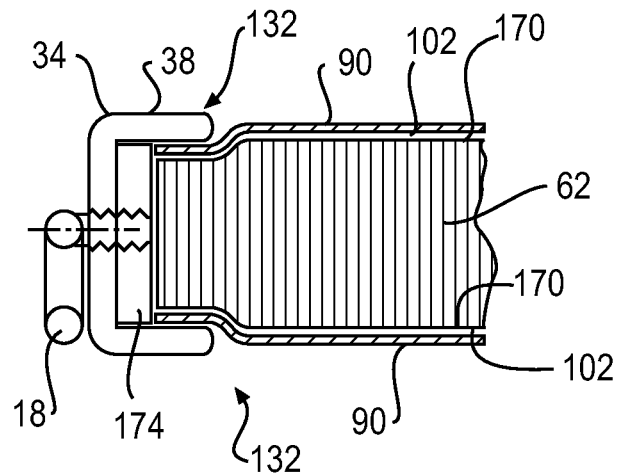
FIG. 33 is a magnified schematic section of a frame and composite floor portion assembly of a cargo pallet in accordance with an embodiment of the present invention.

A two-faced tape 170 is used in the embodiment of FIG. 33 to further secure the thermoplastic material 102 to the honeycomb core 62. Alternatively, the two-faced tape 170 (sticky on both sides thereof) can be used to secure the sheet of aluminum 90 to the thermoplastic material 102. Also, the two-faced tape 170 can be used to secure the sheet of aluminum 90 to the thermoplastic material 102 and the two-faced tape 170 can be used to secure the sheet of aluminum 90 to the thermoplastic material 102 to the honeycomb core 62. An additional spacer 174 is also illustrated to provide a stronger fastening force to the anchoring elements 18 through the frame 34. What is the element drawn in the center of the additional spacer 174?

Figure 34:
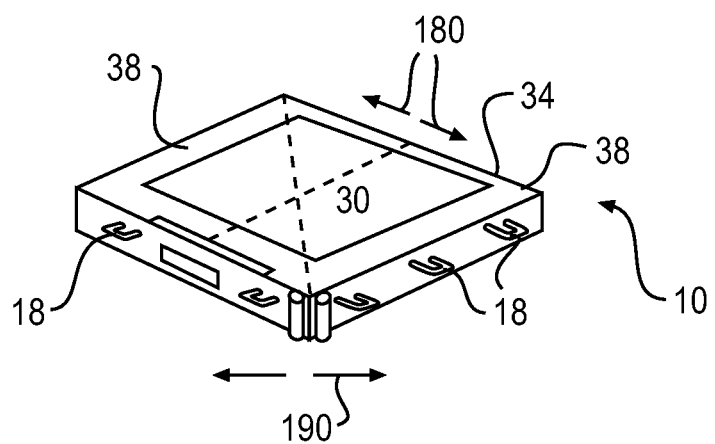
FIG. 34 is a schematic view of a portion of a composite wall member with reinforcements layouts therein in accordance with embodiments of the invention.

Additionally, FIG. 34 illustrates that the frame 34 can be separated into two to facilitate the insertion of the honeycomb core 62 and the layers of materials 90, 102 therein. An embodiment separates 180 the frame 34 into two distinct frame portions, in the middle of two opposed frame members 38 and another embodiment separates the frame 34 in two 190 across the corners of the frame 34. The honeycomb core 62 and the layers of materials 90, 102 are fitted and pressed against the frame portions, or in a cavity defined therein, by securing the distinct frame portions together.

Figure 35:
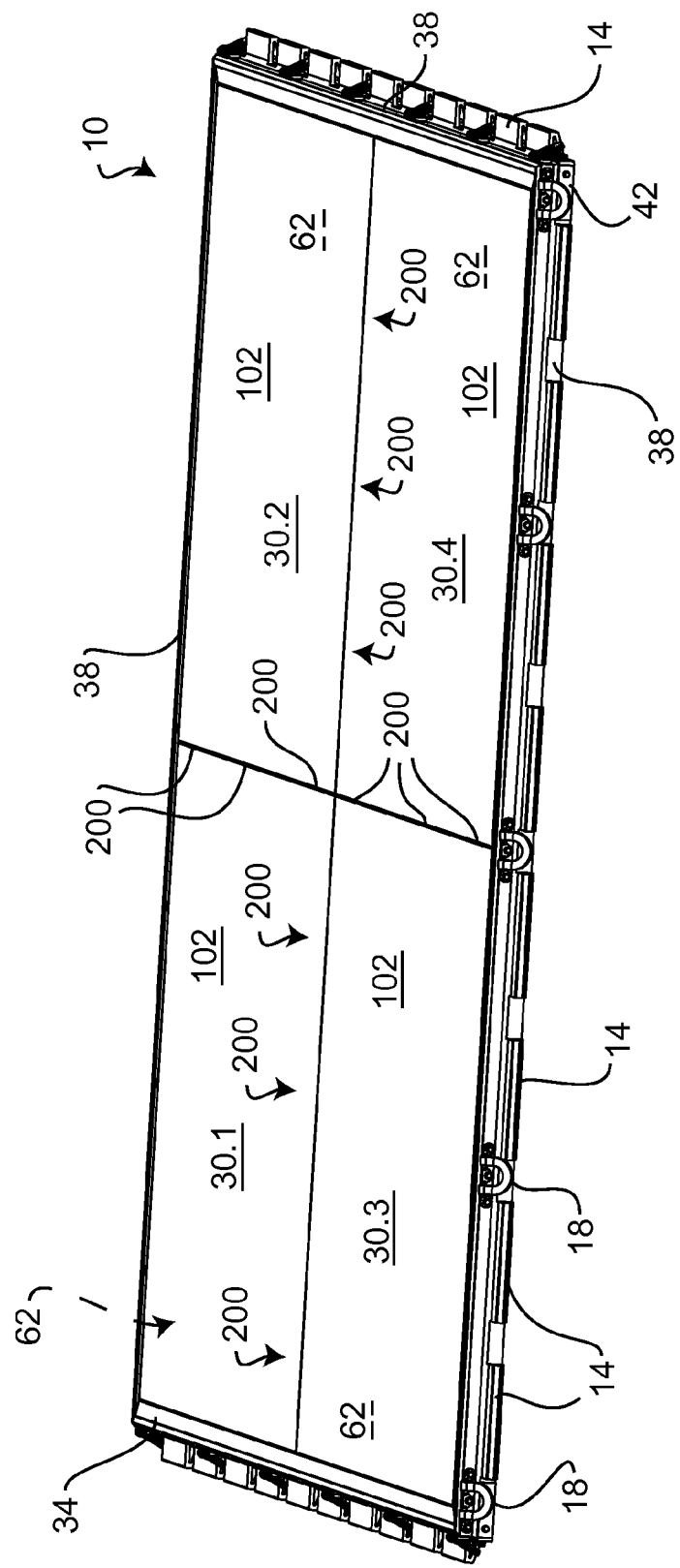
FIG. 35 illustrates a cargo pallet including a plurality of assembled floor portions in accordance with an embodiment of the invention.

FIG. 35 provides another embodiment where a honeycomb core 62, and its associated layers of materials 90, 102 are separated in smaller portions if they are too large to be manufactured in one piece, or if they are simply more expansive to manufacture in their complete size. FIG. 35 illustrates a cargo pallet 10 having a honeycomb core 62, with its associated layers of thermoplastic material 102, separated, for instance, in four floor portions 30.1, 30.2, 30.3 and 30.4. The floor portions 30.1 through 30.4 can conveniently be smaller than the complete size of the floor 30 because they are easier to manufacture in smaller sizes than in larger sizes. They can also be easier to install and secure into the circumventing frame 34.

The present embodiment uses four floor portions 30.1 through 30.4 having a similar size and a square shape, however, the floor portions 30.1 through 30.4 could be manufactured with different sizes and have other suitable shapes without departing from the scope of the present disclosure.

The floor portions 30.1, 30.2, 30.3 and 30.4 need to be expanded against the frame members 38 to ensure sufficient mechanical contact therewith. Wedges, or other suitable expansion members 200, are inserted and pressed between two adjacent floor portions 30.1, 30.2, 30.3 and 30.4 that create a pressure with the opposed floor portions 30.1, 30.2, 30.3, 30.4 against opposite frame members 38.

Figure 36:
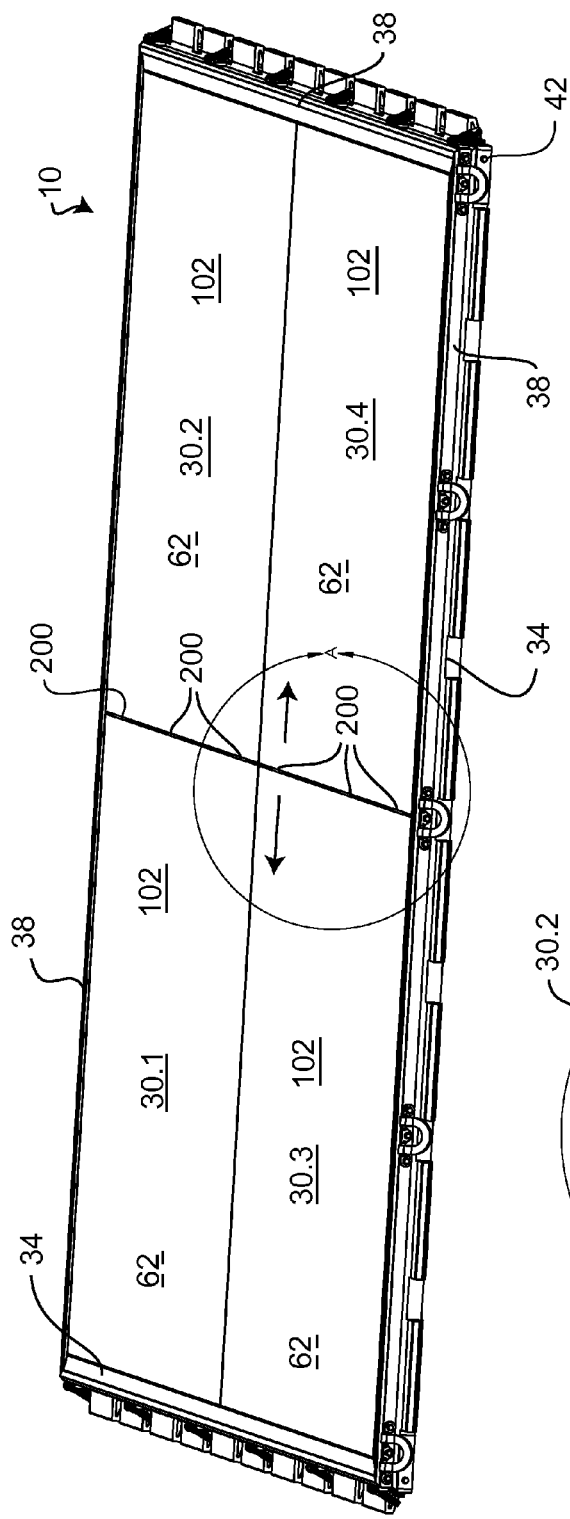
FIG. 36 illustrates a cargo pallet including a plurality of assembled floor portions in accordance with an embodiment of the invention.
Figure 37:
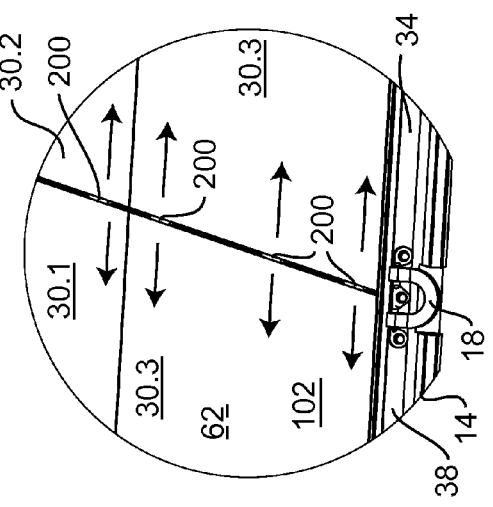
FIG. 37 illustrates a magnified portion of a cargo pallet including a plurality of assembled floor portions with expansion members (wedges) therebetween in accordance with an embodiment of the invention.
Figure 38:
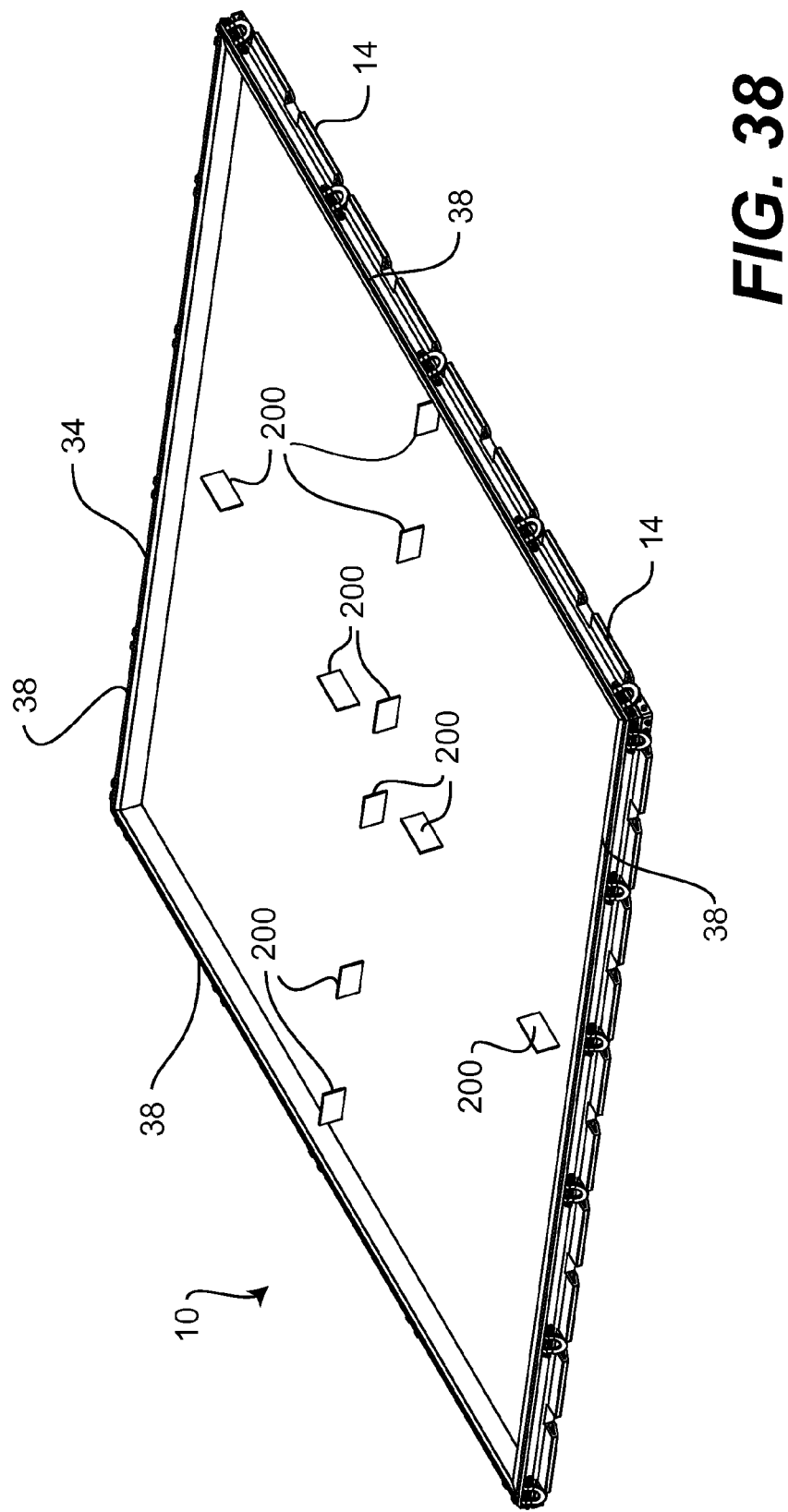
FIG. 38 illustrates a plurality of expansion members located in a cargo pallet including a plurality of floor portions in accordance with an embodiment of the invention.

FIG. 36 illustrates the magnified portion thereof illustrated in FIG. 37. One can appreciate from FIG. 37 four expansion members 200 inserted between the floor portions 30.1, 30.2, 30.3, 30.4. Referring now to FIG. 38 illustrating isolated expansion members 200 without the floor portions 30.1, 30.2, 30.3, 30.4. The layout of the floor portions 30.1, 30.2, 30.3, 30.4 is dictated by the shape and the number of the floor portions 30.1, 30.2, 30.3, 30.4 and can be different from other floor portions 30.1, 30.2, 30.3, 30.4 configurations (not expressly identified in the Figures although it is believed a skilled reader will understand they are components of the frame 30).

Figure 39:
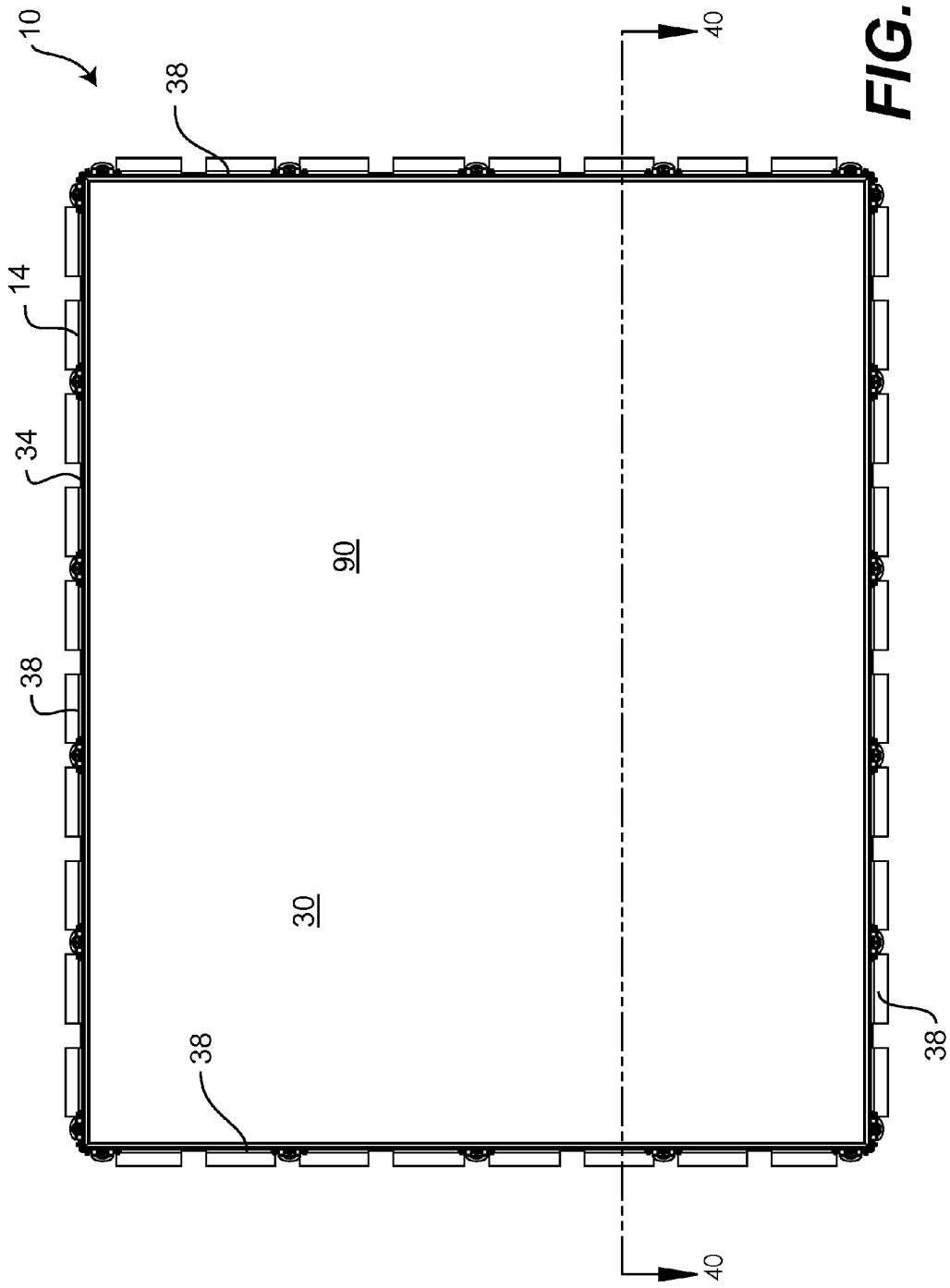
FIG. 39 illustrates a cargo pallet including a plurality of floor portions in accordance with an embodiment of the invention.

FIG. 41 is a magnified section view of a portion of the cargo pallet 10 illustrated in FIG. 39 and FIG. 40. One can appreciate from FIG. 41 that an expansion member 200 is fitted between two floor portions 30.1 and 30.2. The expansion members 200 are pressed into position between the floor portions 30.1 and 30.2, which are composed of their respective honeycomb core 62 and opposed layers of thermoplastic material 102. The expansion members 200, made of wood, plastic, aluminum or other suitable material, can extend through the thickness of the floor portions 30.1 and 30.2 and are cut 204 after installation to ensure that they are properly fit in the floor 30. Once the expansion members 200 are cut, the sheet of aluminum 90 is secured over the layers of thermoplastic material 102, as it can be appreciated in FIG. 41, to cover the junctions between the floor portions 30.1, 30.2, 30.3, and 30.4 the expansion members 200 to seal the floor 30 and increase the overall strength thereof. The sheet of aluminum 90 can be glued, secured with fasteners or rivets, as explained above, to the frame 34 to create a unitary assembly.

FIG. 42 is a magnified portion of two distinct floor portions with intervening expansion members 200 therebetween.

The description and the drawings that are presented above are meant to be illustrative of the present invention. They are not meant to be limiting of the scope of the present invention. Modifications to the embodiments described may be made without departing from the present invention, the scope of which is defined by the following claims.

What is claimed is:

1. A cargo pallet comprising a composite floor portion including a core and layers of composite material respectively disposed on opposed sides of the core, the layers of composite material being adapted to be fused with the core portion to establish a strong connection therebetween, wherein the cargo pallet further comprises a frame made of extruded aluminum circumventing the floor portion, the circumventing frame including extending tabs.

2. The cargo pallet of claim 1, wherein the layers of composite material include fibers and thermoplastic materials.

3. The cargo pallet of claim 1, wherein at least one external skin fiber layer extends substantially over at least one edge of the composite floor portion.

4. The cargo pallet of claim 3, wherein at least one of the layers of composite material includes a radius thereof substantially at an angular surfaces transition between surfaces.

5. The cargo pallet of claim 1, wherein at least one of the layers of composite material include glass fibers and polypropylene.

6. The cargo pallet of claim 5, wherein the at least one of the layers of composite material includes a ratio of about 60% fibers and 40% polypropylene.

7. The cargo pallet of claim 1, wherein the floor portion includes a plurality of sub floor portions adapted to be juxtaposed from one another in a substantially planar fashion.

8. The cargo pallet of claim 7, wherein at least some of the plurality of sub floor portions is separated by a plurality of expansion members adapted to space apart adjacent floor portions against a circumventing frame.

9. The cargo pallet of claim 1, wherein the floor portion is covered by an additional sheet member.

10. The cargo pallet of claim 1, wherein the core is adapted to receive therein inserts adapted to distribute localized mechanical stresses applied to the floor portion.

11. A method of assembling a cargo pallet, the method comprising:
  providing a floor portion including a core and layers of composite materials adapted to be respectively disposed on opposed sides of the core;
  heating both sides of said core;
  heating one side of a first composite layer;
  heating one side of a second composite layer; and
  assembling the heated sides of the core with respective heated sides of the first and second composite layers to fuse the core with the first and second composite layers into a composite floor portion,
  wherein the cargo pallet further comprises a frame made of extruded aluminum circumventing the floor portion, the circumventing frame including extending tabs.

12. The method of claim 11, wherein the composite floor portion is a plurality of sub floor portions, the method further comprising
  assembling at least two sub floor portions within the frame member and the composite floor; and
  inserting at least one expansion member between two adjacent floor portions to space apart the two adjacent floor portions.

13. The method of claim 11, further securing an additional layer of sheet material over the composite layer to protect the composite layer.

14. The method of claim 11, further including at least one insert inside the core.

15. The method of claim 11, further bending at least one side of the composite layer to cover at least one side of the core to transfer normal shear stress to the composite layer.

* * * * *